United States Patent
Gao et al.

(10) Patent No.: US 11,777,576 B2
(45) Date of Patent: Oct. 3, 2023

(54) INTERFERENCE-AWARE BEAM REPORTING IN WIRELESS COMMUNICATIONS

(71) Applicant: ZTE Corporation, Guangdong (CN)

(72) Inventors: Bo Gao, Guangdong (CN); Yu Ngok Li, Guangdong (CN); Zhaohua Lu, Guangdong (CN); Hao Wu, Guangdong (CN); Chuangxin Jiang, Guangdong (CN)

(73) Assignee: ZTE Corporation, Guangdong (CN)

( * ) Notice: Subject to any disclaimer, the term of this patent is extended or adjusted under 35 U.S.C. 154(b) by 279 days.

(21) Appl. No.: 17/211,295

(22) Filed: Mar. 24, 2021

(65) Prior Publication Data

US 2021/0211176 A1   Jul. 8, 2021

Related U.S. Application Data

(63) Continuation of application No. PCT/CN2018/107768, filed on Sep. 26, 2018.

(51) Int. Cl.
*H04B 7/06* (2006.01)
*H04B 17/318* (2015.01)
(Continued)

(52) U.S. Cl.
CPC ......... *H04B 7/0626* (2013.01); *H04B 7/0486* (2013.01); *H04B 17/318* (2015.01); *H04B 17/336* (2015.01); *H04W 24/10* (2013.01)

(58) Field of Classification Search
CPC .. H04B 7/0626; H04B 7/0486; H04B 17/318; H04B 17/336; H04W 24/10
See application file for complete search history.

(56) References Cited

U.S. PATENT DOCUMENTS

| | | |
|---|---|---|
| 2015/0162966 A1 | 6/2015 | Kim et al. |
| 2015/0280877 A1 | 10/2015 | Chen et al. |

(Continued)

FOREIGN PATENT DOCUMENTS

| | | |
|---|---|---|
| CN | 103516464 A | 1/2014 |
| CN | 104428998 | 3/2015 |

(Continued)

OTHER PUBLICATIONS

International Search Report and Written Opinion in International Application No. PCT/CN2018/107768, dated Jun. 24, 2019, 7 pages.

(Continued)

*Primary Examiner* — Deepa Belur
(74) *Attorney, Agent, or Firm* — Perkins Coie LLP

(57) ABSTRACT

A wireless communication method is described for a user equipment to receive a reporting configuration, measure one or more resources, and generate a report transmitted to a base station. The report may include one or more CSI values that describe signal-to-interference-plus-noise ratio (SINR) or reference signal received quality (RSRQ), where the CSI values are determined based on measuring at least some of the one or more resources. The report may also include one or more identifiers associated with at least some of one or more channel measurement resource (CMR) or at least some of interference measurement resource (IMR), or at least some of one or more CMR groups or at least some of one or more IMR groups.

15 Claims, 11 Drawing Sheets

(51) Int. Cl.
*H04B 17/336* (2015.01)
*H04B 7/0456* (2017.01)
*H04W 24/10* (2009.01)

(56) References Cited

U.S. PATENT DOCUMENTS

| | | | |
|---|---|---|---|
| 2017/0141832 A1 | 5/2017 | Ji et al. | |
| 2018/0183556 A1* | 6/2018 | Shin | H04L 5/00 |
| 2020/0007299 A1* | 1/2020 | Han | H04L 5/0094 |
| 2021/0120444 A1* | 4/2021 | Yum | H04L 5/0057 |
| 2022/0116167 A1* | 4/2022 | Wang | H04L 5/006 |
| 2023/0030859 A1* | 2/2023 | Yang | H04B 7/0695 |
| 2023/0141397 A1* | 5/2023 | Kim | H04B 17/336 370/329 |

FOREIGN PATENT DOCUMENTS

| | | |
|---|---|---|
| WO | 2013180549 A1 | 12/2013 |
| WO | 2018/056784 | 3/2018 |
| WO | 2018/128940 | 7/2018 |
| WO | WO-2021172903 A1 * | 9/2021 ........... H04B 17/336 |

OTHER PUBLICATIONS

Zte et al. "Remaining details on CSI measurement" 3GPP TSG RAN WGJ Meeting #92, R1-1801579, Mar. 2, 2018 (Mar. 2, 2018), 6 pages.

Co-Pending CN Application No. 2022103894621, First Office Action dated Oct. 10, 2022, 13 pages with unofficial translation.

ZTE, "Enhancements on multi-beam operation," 3GPP TSG RAN WG1 Meeting #96bis, R1-1904014, Apr. 8-12, 2019, 17 pages.

3GPP. "Physical layer procedures for data," TS 38.214 version 16.2.0 Release 16, Jul. 2020, 167 pages.

3GPP. "Physical layer procedures for data," TS 38.214 version 16.4.0 Release 16, Jan. 2021, 173 pages.

3GPP, "Technical Specification Group Radio Access Network," TS 38.331 version 16.2.0, Sep. 2020, 921 pages.

Co-Pending EP Application No. 18930286.2 Extended Search Report dated Apr. 14, 2022, 8 pages.

Co-Pending EP Application No. 18930286.2 Article 94 Communication dated Mar. 30, 2023, 4 pages.

Co-Pending KR Application No. 10-2021-7012493 Final Rejection dated Apr. 28, 2023, 4 pages with unofficial summary.

Co-Pending CN Application No. 2022103894621, Second Office Action dated Jun. 20, 2023, 10 pages with unofficial translation.

* cited by examiner

INTERFERENCE-AWARE BEAM REPORTING IN WIRELESS COMMUNICATIONS

CROSS-REFERENCE TO RELATED APPLICATIONS

This application is a continuation of International Patent Application No. PCT/CN2018/107768, filed on Sep. 26, 2018, the contents of which are incorporated herein by reference in their entirety.

TECHNICAL FIELD

This disclosure is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques for interference aware beam reporting are disclosed. An exemplary embodiment discloses a wireless communication method that receives, by a communication node, a reporting configuration. The reporting configuration is associated with one or more channel measurement resource (CMR) groups or one or more interference measurement resource (IMR) groups. The method measures one or more CMRs included in the one or more CMR groups or measures one or more IMRs included in the one or more IMR groups. The method generates, by the communication node, a report that includes: one or more channel state information (CSI) values that describe signal-to-interference-plus-noise ratio (SINR) or reference signal received quality (RSRQ), where the one or more CSI values are determined based on the measuring of at least some of the one or more CMRs or at least some of the one or more IMRs, or one or more identifiers associated with at least some of the one or more CMRs, at least some of the one or more IMRs, at least some of the one or more CMR groups, or at least some of the one or more IMR groups. The method transmits the report to a network node.

In some embodiments, an interference measurement for at least one CSI value are obtained based on at least one IMR. In some embodiments, at least one IMR included in the report is associated with a first channel that has low correlation or low interference level with another channel of at least one CMR, or at least one CMR included in the report is associated with a second channel that has low correlation or low interference level with another channel of at least one IMR. In some embodiments, at least one IMR or at least one CMR included in the report is associated with one rank indicator (RI), wherein the one RI is included in the report or configured for the report.

In some embodiments, the one or more CSI values are further based on: one or more channel property assumption (CPA), one or more antenna groups, or one or more beam groups. In some embodiments, one or more IMRs in one IMR group from the one or more IMR groups are associated with a same CPA. In some other embodiments, any one of one or more IMRs in one IMR group from the one or more IMR groups is not associated with a CPA.

In some embodiments, one or more IMRs include one or more reference signal resources for channel measurement or one or more resources for interference measurement. In some embodiments, one or more CMRs include one or more reference signal resources for channel measurement. In some embodiments, each IMR in one IMR group from the one or more IMR groups is associated with different spatial domain filters. In some embodiments, at least one CSI is associated with the one or more identifiers associated with at least some of the one or more IMRs or at least some of the one or more IMR groups.

In some embodiments, the one or more CSI values are determined based on any one option from following set of report options: one or more CMRs and one or more antenna groups; one or more CMRs and one or more beam groups; one or more CMRs, one or more antenna groups, and one or more beam groups; one or more CMRs, one or more IMRs, and one or more antenna groups; one or more CMRs, one or more IMRs, and one or more beam groups; and one or more CMRs, one or more IMRs, one or more antenna groups, and one or more beam groups. In some embodiments, the one option is identified based on the reporting configuration, a CSI resource setting sent by the network node, or a measurement setting sent by the network node.

In some embodiments, at least one CMRs and at least one IMRs are associated with at least one CSI value. In some embodiments, at least one CMRs and at least one IMRs are measured using a same receive beam, a same antenna group, or a same receive beam group. In some embodiments, at least one CMR and at least one IMR are received simultaneously by the communication node.

In some embodiments, at least one IMR in the report or at least one IMR group in the reporting configuration is associated with: at least one CMR in the report or associated with the reporting configuration, or at least one CMR group in the report or associated with the reporting configuration.

In some embodiments, at least one IMR is included in the report based on any one of following: a first parameter to determine that at least one IMR is selected from a same resource group as at least one CMR; a second parameter to determine that at least one IMR is selected from a first resource group different than a second resource group belonging to at least one CMR; a third parameter to determine that at least one IMR is selected from one IMR group from the one or more IMR groups, wherein the one IMR group is associated with at least one CMR, or is associated with one CMR group; and a fourth parameter to determine that at least one IMR is selected from one IMR group from the one or more IMR groups, wherein the one IMR group is not associated with at least one CMR, or is un-associated with one CMR group associated with at the least one CMR. In some embodiments, the first, second, third or fourth parameters are received by the communication node. In some other embodiments, the at least one IMR is included in the report in response to a value of the first parameter, second parameter, third parameter, or fourth parameter being greater than or equal to a corresponding threshold value.

In some embodiments, at least one CMR is included in the report based on any one of following: a first parameter to determine that at least one CMR is selected from a same resource group as at least one IMR; a second parameter to determine that at least one CMR is selected from a first resource group different than a second resource group belonging to at least one IMR; a third parameter to determine that at least one CMR is selected from one CMR group from the one or more CMR groups, wherein the one CMR group is associated with at least one IMR, or is associated with one IMR group; and a fourth parameter to determine that at least one CMR is selected from one CMR group from the one or more CMR groups, wherein the one CMR group is not associated with at least one IMR, or is un-associated with one IMR group associated with at the least one IMR. In some embodiments, the first, second, third or fourth parameters are received by the communication node. In some other embodiments, the at least one CMR is included in the report in response to a value of the first parameter, second parameter, third parameter, or fourth parameter being greater than or equal to a corresponding threshold value.

In some embodiments, at least some of the one or more identifiers are included in a bitmap. In some embodiments, at least some of the one or more identifiers are reported using a bitmap. In some embodiments, a length of the bitmap is determined by a number of resources for CMRs or IMRs associated with the reporting configuration, where each bit position in the bitmap is associated with each resource. In some embodiments, a length of the bitmap is determined by a number of resources for CMR groups or IMR groups associated with the reporting configuration, wherein each bit position in the bitmap is associated with each group.

In some embodiments, the one or more identifiers are reported based on a rule-based threshold value associated with one or more reference signal received power (RSRP), one or more block error rate (BLER), one or more RSRQ or one or more SINR.

In some embodiments, the threshold value associated with one or more RSRP is based on one of following rules: the RSRP corresponding to at least one IMR is greater than or equal to the threshold value, a percentage of the RSRP corresponding to at least one IMR in reference to another RSRP of at least one CMR is greater than or equal to the threshold value, and a difference between an RSRP of at least one CMR and another RSRP of at least one IMR is less than or equal to the threshold value. In some other embodiments, the threshold value associated with one or more RSRP is based on one of following rules: the RSRP corresponding to at least one IMR is less than or equal to the threshold value, a percentage of the RSRP corresponding to at least one IMR in reference to another RSRP of at least one CMR is less than or equal to the threshold value, and a difference between an RSRP of at least one CMR and another RSRP of at least one IMR is greater than or equal to the threshold value.

In some embodiments, the threshold value associated with one or more BLER is based on: a first value associated with the BLER determined based on at least one CMR and at least one IMR, and a second value associated with the BLER determined based on the at least one CMR, where the difference between the first value and the second value is greater than or equal to the threshold value. In some embodiments, the threshold value associated with one or more BLER is based on: one value associated with the BLER determined based on at least one CMR and at least one IMR, where the one value is greater than or equal to the threshold value.

In some other embodiments, the threshold value associated with one or more BLER is based on: a first value associated with the BLER determined based on at least one CMR and at least one IMR, and a second value associated with the BLER determined based on the at least one CMR, where the difference between the first value and the second value is less than or equal to the threshold value. In some other embodiments, the threshold value associated with one or more BLER is based on: one value associated with the BLER determined based on at least one CMR and at least one IMR, where the one value is less than or equal to the threshold value.

In some embodiments, the threshold value associated with the one or more RSRQ or the one or more SINR is based on a difference between a first value associated with one RSRQ or one SINR determined based on at least one CMR and at least one IMR, and a second value associated with the one RSRQ or the one SINR determined based on the at least one CMR, where the difference between the first value and the second value is less than or equal to the threshold value.

In some other embodiments, the threshold value associated with the one or more RSRQ or the one or more SINR is based on a difference between a first value associated with one RSRQ or one SINR determined based on at least one CMR and at least one IMR, and a second value associated with the one RSRQ or the one SINR determined based on the at least one CMR, where the difference between the first value and the second value is greater than or equal to the threshold value.

In some embodiments, the communication node generates the report by prioritizing a first set of information associated with the one or more CMRs over a second set of information associated with the one or more IMRs. In some embodiments, where at least some of the second set of information is excluded from the report, and where at least some of the first or the second set of information is excluded based on a total size of the first set of information and the second set of information exceeding a threshold value. In some embodiments, the first set of information is associated with a high-priority part included in the report, and where the second set of information is associated with a low-priority part included in the report.

In some embodiments, the identifiers are associated with a first set of one or more resources or a second set of one or more resources, where the first set of one or more resources are included in the report based on the SINR or RSRQ of each resource in the first set being greater than or equal to a first threshold value, and where the second set of one or more resources are included in the report based on the SINR or RSRQ of each resource in the second set being less than or equal to a second threshold value.

In some embodiments, a number of combinations is included in the report, wherein each combination includes K1 IMRs, K2 IMR groups, K3 CMRs or K4 CMR groups, wherein K1, K2, K3 and K4 are positive integer. In some embodiments, each combination includes K3 CMRs or K4 CMR groups, wherein interference measurement for at least one CSI value associated with the one CMR or one CMR group in one combination included in the report are obtained based on another CMRs or another CMR groups in the one combination.

In some embodiments, at least some of the one or more IMR included in the report and at least some of the one or more CMR included in the report are from a same one or more CMR groups.

In another exemplary embodiment, a wireless communication method generates, by a network node, a reporting configuration, where the reporting configuration indicates one or more channel measurement resource (CMR) groups or one or more interference measurement resource (IMR) groups, where the one or more CMR groups includes one or more CMRs, and where the one or more IMR groups includes one or more IMRs. The method transmits the reporting configuration to a communication node, and receives a report from the communication node after the transmitting of the reporting configuration. The report includes one or more channel state information (CSI) values that describe signal-to-interference-plus-noise ratio (SINR) or reference signal received quality (RSRQ), where the one or more CSI values are determined based on at least some of the one or more CMRs or at least some of the one or more IMRs, or one or more identifiers associated with at least some of the one or more CMRs, at least some of the one or more IMRs, at least some of the one or more CMR groups, or at least some of the one or more IMR groups.

In yet another exemplary aspect, the above-described methods are embodied in the form of processor-executable code and stored in a computer-readable program medium.

In yet another exemplary embodiment, devices that are configured or operable to perform the above-described methods are disclosed.

The above and other aspects and their implementations are described in greater detail in the drawings, the descriptions, and the claims.

DETAILED DESCRIPTION

This patent document describes techniques that can improve wireless performance in a beamforming wireless environment. In some embodiments, a user equipment (UE) can generate and send a report to a base station to provide information such as reference signal received quality (RSRQ) and/or signal-to-interference-plus-noise ratio (SINR) for one or more transmission-related beams and/or one or more interference-related beams. This document will first briefly describe beamforming technology followed by six sections where several features and embodiments related to UE measurement reporting schemes are described. The example headings for the various sections below are used to facilitate the understanding of the disclosed subject matter and do not limit the scope of the claimed subject matter in any way. Accordingly, one or more features of one example section can be combined with one or more features of another example section.

For wireless systems that use a wide or ultra-wide spectrum resource (e.g., 20 MHz or greater), the propagation loss induced by the extremely high frequency becomes a noticeable challenge. To solve this problem, among others, antenna array and beamforming (BF) training technologies using Massive MIMO may be used to achieve beam alignment and to obtain a high antenna gain. As an example, a Massive MIMO can include 1024 antenna element for one node or a wireless communication equipment. To keep a low complexity and low cost of implementation while still benefitting from the antenna array, analog phase shifters become an attractive solution for implementing Millimeter Wave (mmWave) BF. The use of analog phase shifters can mean that the number of phases are finite and that constant modulus constraints are placed on the antenna elements. Given the pre-specified beam patterns, the variable-phase-shift-based BF training can generally identify the best pattern for subsequent data transmission, for example, in the one transmission reception point (TRP) or one-panel case.

Figure 1:
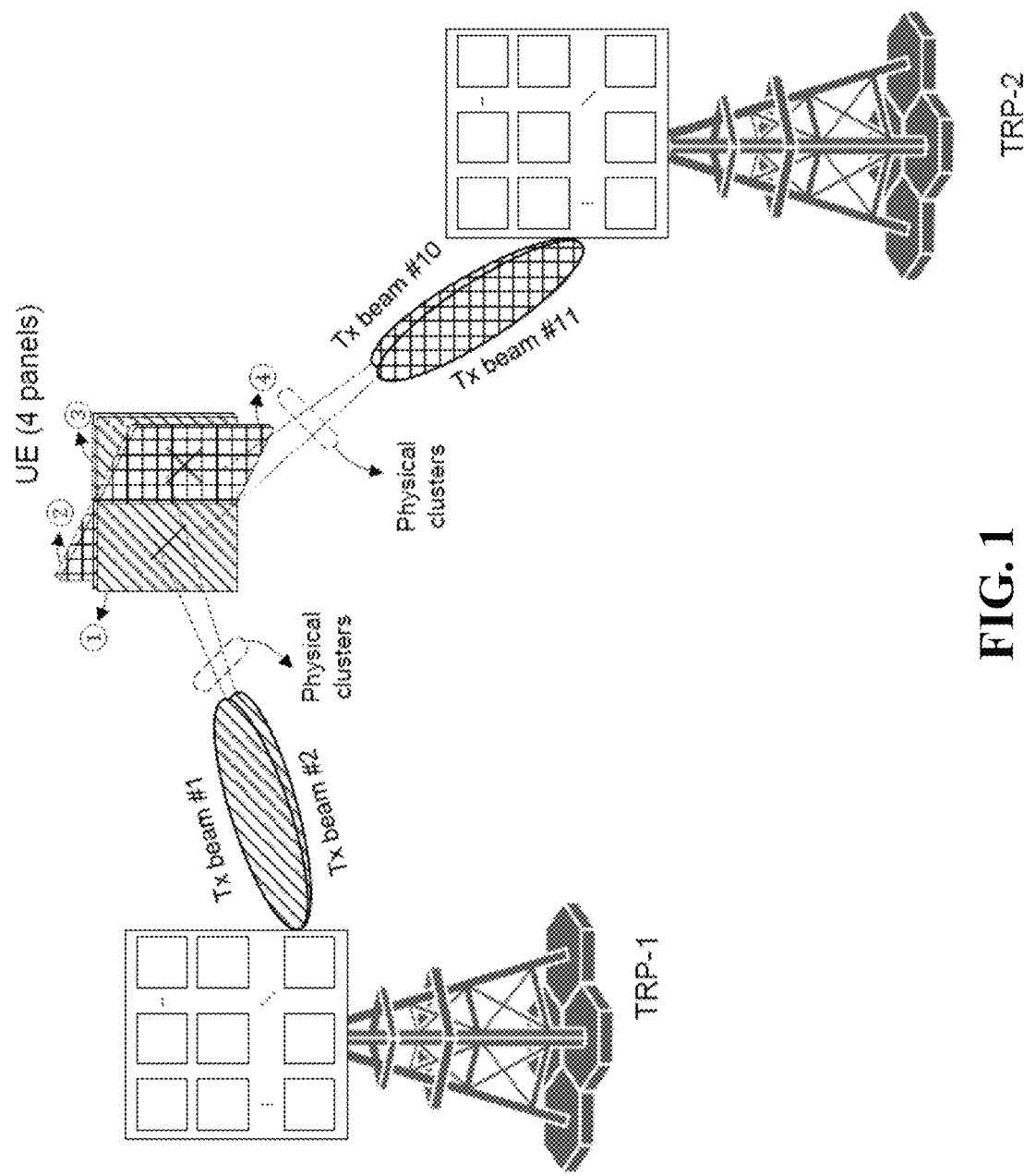
FIG. 1 shows an exemplary user equipment (UE) with four panels in a beamforming wireless environment.

FIG. 1 shows an exemplary UE with four panels in a beamforming wireless environment. The UE antenna panels 1 to 4 can be described using variables Mg and Ng, where Mg describes a number of panels in a column and Ng describes a number of panels in a row. In FIG. 1, the UE antenna panels can have Mg=1 and Ng=4, where angle between panels $\Theta_{mg,ng}$=90; $\Omega_{0,1}=\Omega_{0,0}+90$; $\Omega_{0,2}=\Omega_{0,0}+180$; $\Omega_{0,3}=\Omega_{0,0}+270$. Thus, in FIG. 1, the four panel of UE has 1 column panel and four row panels, where each row panel is arranged 90 degrees from another row panel. The spacing between the UE panels in a horizontal direction (dgH) is 0 and the spacing between the panels in a vertical direction (dgV) is 0. Each base stations, or transmission reception point TRP, namely TRP-1 and TRP-2 has an array of column and row antenna panels that can also be described using the variables Mg and Ng.

Generally, the multi-TRP and multi-panel cases can be considered for a 5G base station (gNB) where multiple panels associated with a UE can cover a whole space for coverage. As one exemplary case, one panel for TRP and UE sides can have two transceiver units (TXRUs) that are associated with cross polarization accordingly. Therefore, in order to achieve a high RANK transmission, the TRP and UE may use different beams generated from different panels with the objective of sufficiently using capability of each panel, such as its associated TXRUs.

To achieve beam determination, 3GPP NR uses L1-RSRP reporting for beam management, which can be considered to describe one kind of beam quality. Specifically, the following description for RSRP is used for synchronization signal (SS):

SS reference signal received power (SS-RSRP) is described as the linear average over the power contributions (in Watts) of the resource elements that carry secondary synchronization signals (SS). The measurement time resource(s) for SS-RSRP are confined within SS/PBCH Block Measurement Time Configuration (SMTC) window duration. If SS-RSRP is used for L1-RSRP as configured by reporting configurations, the measurement time resources(s) restriction by SMTC window duration is not applicable. For example, 3GPP TS 38.214 defined certain configurations used for L1-RSRP.

For SS-RSRP determination, demodulation reference signals for physical broadcast channel (PBCH) and, if indicated by higher layers, CSI reference signals in addition to secondary synchronization signals may be used. SS-RSRP using demodulation reference signal for PBCH or CSI reference signal can be measured by linear averaging over the power contributions of the resource elements that carry corresponding reference signals taking into account power scaling for the reference signals as defined in 3GPP TS 38.213. If SS-RSRP is not used for L1-RSRP, the additional use of CSI reference signals for SS-RSRP determination is not applicable.

SS-RSRP can be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP can be measured only from the indicated set of SS/PBCH block(s).

For frequency range 1, the reference point for the SS-RSRP can be the antenna connector of the UE. For frequency range 2, SS-RSRP can be measured based on the combined signal from antenna elements corresponding to a given receiver branch. For frequency range 1 and 2, if receiver diversity is in use by the UE, the reported SS-RSRP value may not be lower than the corresponding SS-RSRP of any of the individual receiver branches.

The number of resource elements within the measurement period that are used by the UE to determine SS-RSRP is left up to the UE implementation, where corresponding measurement accuracy requirements have to be fulfilled. The power per resource element is determined from the energy received during the useful part of the symbol, excluding the cyclic prefix (CP).

In 5G NR, analog beam-forming is firstly introduced into mobile communication for guaranteeing the robustness of high frequency communications. Regarding the reporting for channel qualities in beam management, reference signal (RS) received power (RSRP) is one metric that is currently used for beam reporting. Generally, UE will report N Tx beams (e.g., downlink (DL) reference signal (RS) index(es)) where N is greater than or equal to 1, with objective of maximizing RSRP as well as its corresponding L1-RSRP results. Subsequently, gNB will select one beam from candidate set according to beam reporting and its scheduling schemes. However, this kind of selection criterion may not reflect the quality of some beams from the perspective of data transmission.

In some scenarios, RSRP may not be the best metric to select a beam. The RSRP is described as the linear average (in Watts) over the power contribution of the resource elements that carry the corresponding DL RSs for measurement, where the power per resource element is determined from the energy received during the useful part of symbol, excluding CP. Thus, the RSRP can only represent the receive power corresponding to the DL RS without considering impacts of interference and/or noise powers, and may not be able to accurately represent the transmission performance. For instance, different interference level could be observed for different beam link, and, as a result, one beam link with larger RSRP may have worst block-error rate (BLER) performance than that with smaller RSRP.

Consequently, SINR and/or RSRQ may be introduced into beam reporting as a metric(s) in addition to RSRP, to improve performance of beam reporting and subsequent beam determination for transmission. For SINR and RSRQ determination, at least the following three technical problems are solved for beam reporting in this patent document:

A first technical problem relates to the issue of identifying the interference beam. For a given transmission, the interference is not only related to Tx beam indication for UE specific transmission, e.g., DL RS for channel measurement, but also related to gNB scheduling for other UEs, e.g., Tx beam for other UEs in MU-MIMO, due to the property of direction of interference transmission. According to the current definition of RSRQ and SINR (as further described below), RSRQ/SINR is determined only based on the DL RS for channel measurement without considering any additional DL RS s to represent interference signals, which can impact the effectiveness of results of interference measurements.

In current specification, NR have the following definition for SINR and RSRQ that are only used for L3 measurement rather than beam reporting. Currently, SINR is defined as the linear average over the power contribution (in Watts) of the resource elements carrying DL RS divided by the linear average of the noise the interference power contribution over the corresponding DL RS within the same frequency bandwidth. And, RSRQ is currently defined as the ratio of ((N*RSRP)/(NR carrier RSSI), where NR carrier RSSI is the received signal strength indicator of the NR carrier, and N is the number of resource blocks in the NR carrier RSSI measurement bandwidth.

NR carrier RSSI comprises the linear average of the total received power (in Watts) observed in certain OFDM symbols of measurement time resources, in the measurement bandwidth, over N number of resource blocks from all sources, including co-channel serving and non-serving cells, adjacent channel interference, thermal noise, etc.

A second technical problem is that current technology does not provide a UE with a technique to determine interference caused by other UEs. The interference-related beam is related to gNB Tx beams and depends on UE-side Rx beam-forming so that there may be different interference-related beam for different Tx-Rx beam links. In current NR architecture, there are some definitions for L3 measurement rather than beam reporting where only RSRQ is reported with corresponding Tx beam ID as one solution. However, L3 measurement does not describe which of the one or more other UE related transmission events cause the interference. As a result, by only using a L3 measurement, a gNB assumes that all candidate beams provide the same interference, which means that gNB may not be able to do any further optimization for subsequent transmission, e.g., through only preventing from simultaneous transmission for some Tx beam combinations which introduce inter-beam interference, but still scheduling multi-user MIMO for other TX beam combinations.

A third technical problem relates to the issue of a number of beams to be reported. The maximum number of DL Tx beams to be transmitted or received simultaneously can be based on the capability of gNB or UE, depending on the number of TRPs or panels from gNB or UE sides, respectively. Consequently, determining interference-related beams can be based on the UE or gNB capabilities accordingly, e.g., how to indicate Rx beam for UE sides during interference measurement and reporting.

In this patent document, the term beam can refer to reference signal or a resource for measurement, spatial filter or precoding. The term Tx beam can refer to DL or UL reference signaling, such as channel state information reference signal (CSI-RS), synchronization signaling block (SSB) (which is also called as SS/PBCH)), demodulation reference signal (DMRS), sounding reference signaling (SRS), DL or UL resource for measurement, such as CSI-interference measurement (CSI-IM) resource, Tx spatial filter, or Tx precoding. The term Rx beam can refer to spatial filter, Rx spatial filter or Rx precoding. Further, the term beam ID can refer to reference signaling index, resource index, spatial filter index or precoding index. The term channel property assumption (CPA) can refer to quasi co-location (QCL) information, transmission configuration indication (TCI), spatial filter, antenna group, beam group, or RS set. The QCL information can include one or more RS sets. Further, one RS set contains one or more RSs and their corresponding QCL type parameters, where QCL type parameters include one or more of the following aspect or combination: Doppler spread, Doppler shift, delay spread, average delay, average gain, and spatial parameter. The spatial filter can be either UE-side or gNB-side.

The term different CPA may refer to the case that at least RSs associated with the spatial parameter of QCL of the DL RSs or channels are different, irrespective of other QCL type parameters as mentioned above. Or, the term different CPA may refer to the case that any RSs associated with any type parameters of QCL of the DL RSs or channels are different. The term beam group may refer to different Tx beams within one group that can be simultaneously received or transmitted, but Tx beams between different groups that may not be simultaneously received or transmitted. The term antenna group may refer to different Tx beams within one group that may not be simultaneously received or transmitted, but Tx beams between different groups that can be simultaneously received or transmitted. Further, the term antenna group may refer to more than N different Tx beams within one group that may not be simultaneously received or transmitted, but no more than N different Tx beams within one group that can be simultaneously received or transmitted, where N is positive integer, while Tx beams between different groups can be simultaneously received or transmitted. If one TRP contains N panels, up to N different beams can be simultaneously received or transmitted, where the antenna group may include N Tx beams that can be simultaneously transmitted. For instance, an antenna group can have more than N Tx beam, e.g., M Tx beams where M is a positive integer, but only N out of M Tx beam can be transmitted simultaneously. Furthermore, the term received simultaneously can be divided into two categories: received simultaneously for spatial multiplexing or received simultaneously but not for spatial multiplexing. The term transmitted simultaneously can be divided into two categories: transmitted simultaneously for spatial multiplexing or transmitted simultaneously but not for spatial multiplexing.

The term channel-state information (CSI) may include one or more of the following: RSRP, RSRQ, SINR, Received Signal Strength Indicator (RSSI), channel quality indicator (CQI), preceding matrix indicator (PMI), and rank indicator (RI). In this patent document, RSRQ and/or SINR are referred to as beam-quality information (BQI).

I. Embodiment #1—Measurement, Resource, and Reporting Setting for Beam Management To achieve the beam measurement, a resource configuration for multiple panels or multiple TRPs can be performed, where panel or TRP dedicated information can be distinguished through different resource set or CSI resource setting. A resource set may include one or more DL resources such as a synchronization signaling block (SSB), a channel state information reference signal (CSI-RS) resource, or a channel state information interference measurement (CSI-IM). SSB is also called as synchronization signal (SS), or synchronization signal (SS)/physical broadcast channel (PBCH) block (SS/PBCH). A CSI resource setting may include some common configuration information, such as timing behavior (e.g., periodic, aperiodic, semi-persistent) or bandwidth that can enable a UE to measure the DL RSs, besides one or more CSI resource sets. In some embodiments, a resource set or a CSI resource setting can be associated with one TRP or one panel. From the perspective of gNB, in multi-panel or TRP cases, one or more resource sets, for example, $0\sim(N_{TRP}-1)$ resource sets, can be configured so that each resource set can correspond to one TRP or one panel and each resource set can include one or more DL RSs. The DL RSs within the set are generated from its associated TRP or panel.

Taking into account the TRP or panel's capability, the number of Tx beams which can be transmitted simultaneously can be limited, where Tx beams can be equivalent to the DL resources. For instance, in a scenario where there are two TRPs in one cell, TRP-A can generate two different Tx beams simultaneously, but TRP-B can generate one Tx beam simultaneously in one time instance.

Therefore, in some embodiments, a reporting configuration (described in FIGS. 2A and 2B below) can include a criterion, for example, Nsimu_num_max, that can describe a maximum number of Tx beams to be transmitted simultaneously per resource set. But, for the CSI or beam reporting perspective, Nsimu_num (<Nsimu_num_max) can be configured by higher layer parameters related to the reporting configuration for the number of beams (e.g., number of resources) to be reporting per group for one resource set as one restriction or constraint for interference-aware reporting. Nsimu_num is to configure the number of beam to be reported, which may only include transmission-related beams (TR-beams) recommended for subsequent data transmission, or may include both TR-beams and interference-related beams (IR-beams) recommended for preventing a TR-beam from being used for other UE(s) in MU-MIMO while the TR-beam is used for one UE.

Figure 2A:
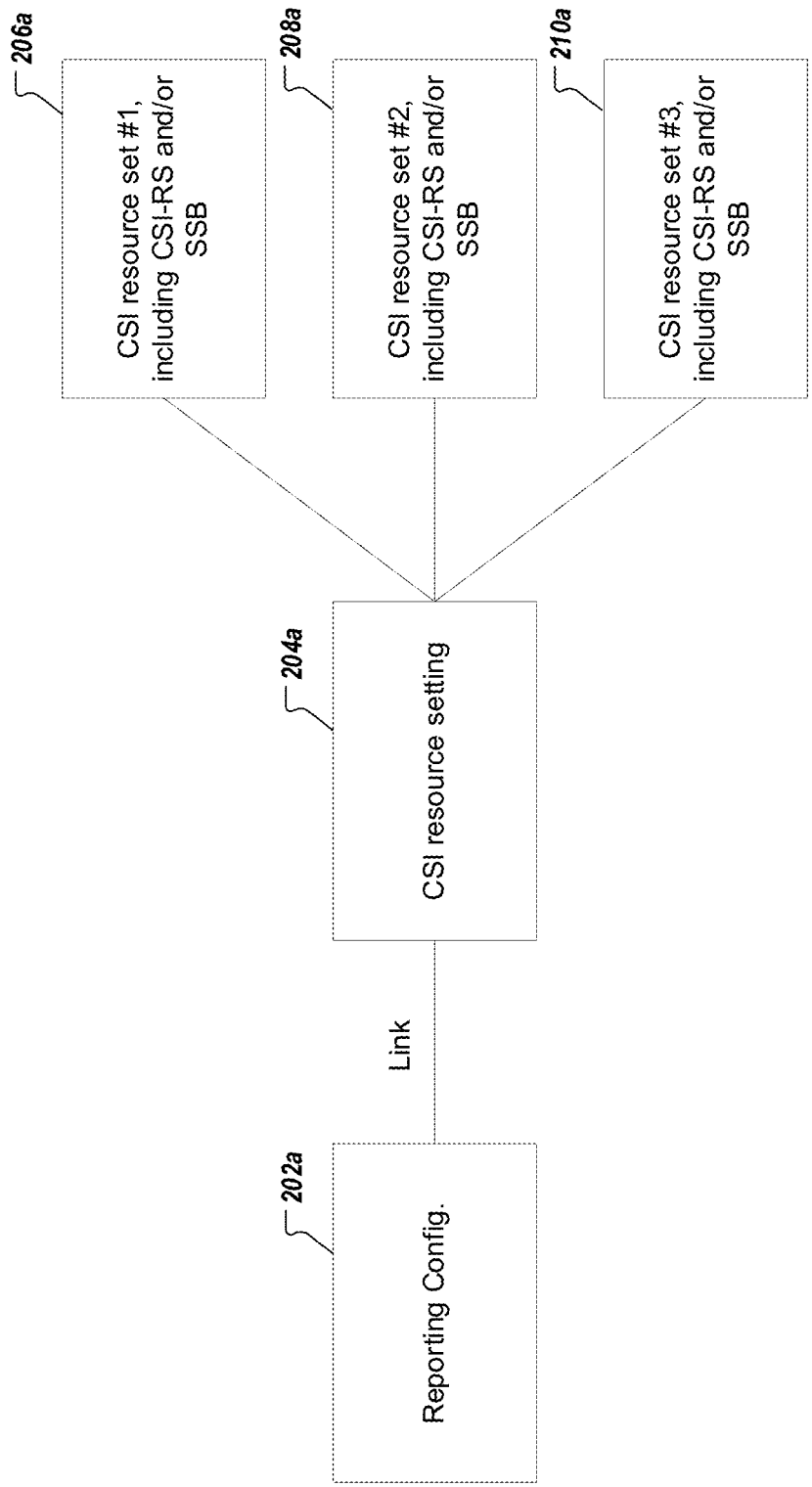
FIGS. 2A and 2B show two examples of reporting configuration for multiple transmission reception points (TRPs) or multiple panels.
Figure 2B:
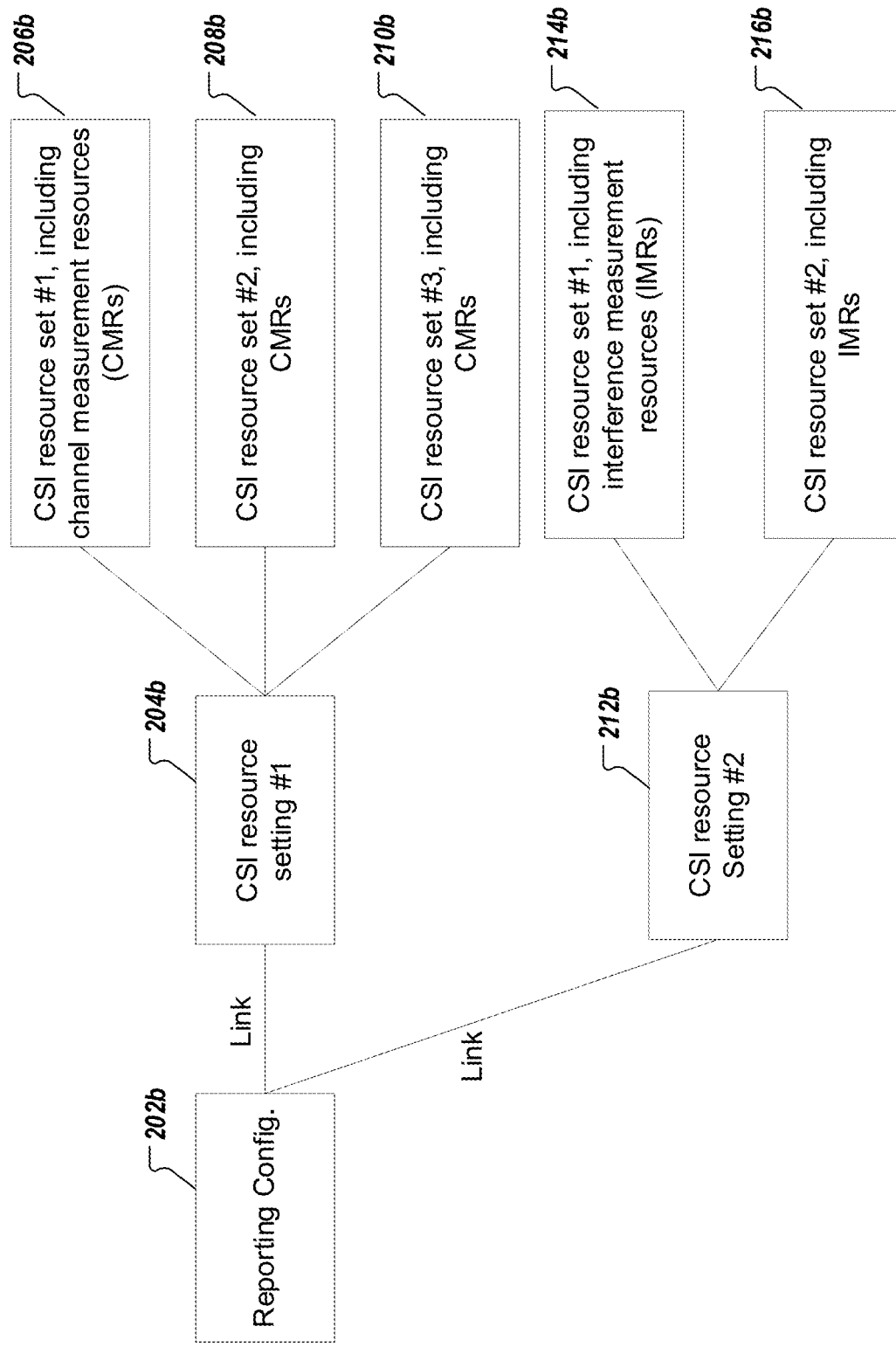

FIGS. 2A and 2B show two examples of reporting configuration for multiple TRPs or multiple panels. In some embodiments, as shown in FIG. 2A, a CSI reporting framework can include a reporting configuration 202a (also known as a reporting setting) associated with one or more reporting criteria. The reporting configuration 202a may be linked with one channel state information (CSI) resource setting 204a (also known as resource setting) that is associated with one or more CSI resource sets 206a-210a, (also called as resource set). Each resource set can include either CSI-RS or SSB or both CSI-RS and SSB. In this exemplary framework, the information about differentiating multi-TRP and multi-panel is represented by CSI resource set.

FIG. 2B shows another exemplary framework where the reporting configuration is linked with one or more CSI resource setting. In such an exemplary framework, the reporting configuration can be linked with more than one CSI resource setting, where each CSI resource setting includes or identifies one or more CSI resource sets. In FIG. 2B, the first CSI resource setting 204b is for channel measurement so that the associated one or more resource sets 206b, 208b, and 210b include one or more channel measurement resources (CMRs). The CMRs can include CSI-RS and/or SSB resources. The second CSI resource setting 212b is for interference measurement resources (IMRs) so that the associated one or more resource sets 214b and 216b can include one or more IMRs, such as non-zero-power (NZP) CSI-RS resource, SSB resource, or zero-power CSI-IM.

The UE receives a reporting configuration and measures the one or more CMRs or one or more IMRs. The CMRs or IMRs are associated with the reporting configuration in one or more CMR groups or one or more IMR groups, respectively, associated with the reporting configuration. After measurement, a UE generates a report based on the reporting configuration where the report may be associated with the reporting setting, CSI resource setting, or CSI resource set, and where the report is sent by the UE to the gNB. The report may include any one or more of the following for beam management: IR-beam identifier (also known as IMR ID), TR-beam identifier (also known as CMR ID), RSRP, RSSI, BQI (e.g., SINR and/or RSRQ), and rank indicator (RI), where beam ID can be represented by at least one of the following: CSI-RS resource indicator (CRI), SSB resource indicator (SSBRI), CSI resource set ID, CSI resource setting ID, reporting setting ID.

II. Embodiment #2—General Description for Interference-Aware Beam Reporting

Interference-aware beam reporting, compared with normal beam reporting based on L1-RSRP, may provide the following information to gNB side: (a) a result of channel quality considering noise and interference (e.g., BQI where BQI may include SINR and/or RSRQ), and/or (b) one or more identifiers associated with at least some of one or more interference-related beams (also known as IMRs), or at least some of one or more transmission-related beams (also known as CMRs), or at least some of one or more IMR groups, or at least some of one or more CMR groups. For instance, an identifier included in the report may be associated with one IMR or an identifier included in the report may be associated with one IMR group. The generated report may include identifiers associated with one or more IMRs or one or more CMRs that are fewer than the IMR(s) and CMR(s) included in the reporting configuration. For example, 16 CMRs may be configured for the reporting in a reporting configuration received by a UE, and the UE may only send two identifiers associated with the two CMRs that can maximize RSRQ.

A UE may determine an interference measurement for at least one BQI value (or at least one CSI value) based on at least one IMR. At least one IMR may be associated with one interference corresponding to at least one CMR. At least one IMR may be associated with a channel that is quasi non-correlated or quasi non-interfered with another channel of at least one CMR. At least one IMR or at least one CMR may be associated with one rank indicator (RI) included in a report generated by the UE or configured for the report. The channel quality is measured by the UE according to DL Tx beam, DL Rx beam, or antenna/beam group, where the identifiers of the DL Tx beam, DL Rx beam, or antenna/beam group may be reported by UE or configured by gNB (as shown in the exemplary Tables in this patent document).

In an exemplary embodiment, one or more BQI values (or one or more CSI values) to be reported in a beam report can be determined by the UE by performing measurement based on any one of the following hierarchical associations: (1) one or more BQI values are determined according to one or more CMRs, and (2) one or more BQI values are determined according to one or more CMRs, and one or more IMRs. For (1) where BQI value is determined according to CMR(s), the UE may measure the signals related to CMR(s), and the UE may determine SINR according to receiving the sequence of CMR(s). For (2) where BQI is determined according to CMR(s) and IMR(s), the UE may determine SINR according to receiving the sequence of CMR(s), and the UE may determine interference and noise by calculating the average power according to the CMR(s) and the IMR(s). Thus, the UE assumes that any related power received from the IMR(s) is interference.

To assist UE to determine its Rx beam(s), one or more CMRs and one or more IMRs can be configured with one or more channel property assumptions (CPAs), respectively, or one or more CMRs can be configured with one or more CPAs but the CPA for one or more IMRs can be derived from the corresponding one or more CMRs. The CPA may include quasi co-location (QCL) information, a transmission configuration indication (TCI), a spatial filter, or a reference signal set. The reference signal set may include one or more reference signals and one or more QCL type parameters. In some embodiments, one interference measurement RS may have the same CPA as channel measurement RS per resource in order.

In some embodiments, a UE can determine one or more CSI values by performing channel quality measurement based on one or more CMRs, one or more IMRs, one or more CPA, one or more antenna groups, or one or more beam groups. The one or more IMRs may include the one or more reference signal resources for channel measurement or one or more resources for interference measurement. The one or more CMRs may include one or more reference signal resources for channel measurement. In some embodiments, at least one CSI is associated with one or more identifiers of one or more interference measurement resources, such as non-zero-power CSI-RS resources or CSI-IM resources.

When considering multi-panel from UE sides, interference-aware beam reporting may be merged with the group-based reporting. In some embodiments, one or more BQI values to be reporting can be based on any one of the following association (with numbering continued from the associations described above): (3) one or more BQI values are determined according to one or more CMRs and one or more antenna groups associated with one UE side; (4) one or more BQI values are determined according to one or more CMRs and one or more beam groups associated with one UE side; (5) one or more BQI values are determined according to one or more CMRs, one or more antenna groups associated with one UE side, and one or more beam groups associated with the UE side; (6) one or more BQI values are determined according to one or more CMRs, one or more IMRs, and one or more antenna groups associated with one UE side; (7) one or more BQI values are determined according to one or more CMRs, one or more IMRs, and one or more beam groups associated with one UE side; and (8) one or more BQI values are determined according to one or more CMRs, one or more IMRs, one or more antenna groups associated with one UE side, and one or more beam groups associated with the UE side.

In some embodiments, at least one CMR and at least one IMR may be associated with at least one CSI (e.g., BQI) value. In some embodiments, UE may use a same receive beam, a same antenna group, or a same receive beam group for measuring the CMR(s) and IMR(s) for determining one channel quality. In some embodiments, at least one CMR and at least one IMR are received simultaneously by the UE.

For one interference-aware reporting, selecting which one of the above associations (1) to (8) for BQI depends on a measurement setting, a CSI resource setting or a reporting setting sent to the UE from the gNB. For instance, CMRs and IMR may be both configured through separate resource settings associated with one reporting setting (as shown in FIG. 2B). But, for one subsequent beam reporting, gNB can further configure that at least one BQI value is to be reported based on CMR only or both CMR and IMR. For instance, the gNB can further configure at least one BQI value to be reported by configuring one or more IMRs. If IMR is configured that UE may use both CMR and IMR to determine and report BQI value, and if IMR is not configured then the UE may only use CMR to determine and report BQI value.

Besides BQI, for supporting the subsequent MU-MIMO, the interference-aware beam reporting is to report one or more IR-beam indexes associated with one TR-beams. Furthermore, IR-beams may be selected based on the following three technical features:

1. Candidate pool for IR-beam: one IR-beam to be reported is to select one resource index from resource group (e.g., at least one CSI resource setting or at least one CSI resource set) for CMR or a resource group for IMR, or to indicate one index for one or more TR resources (or beam (s)), where the index represents the transmission related beam ID included in the report instance generated and sent by the UE to the gNB. In some embodiments, at least one the IMR included in the report or at least one IMR group associated with the reporting configuration is associated with at least one CMR associated with the report or reporting configuration or at least one CMR group associated with the report or reporting configuration.

The IR-beam and its associated TR-beam can be simultaneous transmitted by one gNB, considering the gNB's capability. In some embodiments, if one gNB only can transmit one Tx beam in one given time, IR-beam does not need to be reported. In some other embodiments, there are two CSI resource sets corresponding to two different TRPs. Different DL RSs from different resource sets can be transmitted simultaneously, but different DL RS s from different resource set may not be transmitted simultaneously. Consequently, in embodiments that include two CSI resource set corresponding to two different TRPs, the IR-beam and its associated TR-beam may be selected from different resource set. In some embodiments, one or more IMRs in one IMR group (e.g., same reporting setting, same CSI resource setting or same CSI resource set) are associated with a same CPA. In some other embodiments, any one of one or more IMRs in one IMR group may not be associated with a CPA. From the perspective of UE side, each IMR in one IMR group may be associated with different spatial-domain filter.

A UE may determine whether or not to include one or more IMRs in the generated report according to any one of the following rules:

(i) a first parameter to indicate whether at least one IMR can be selected from the same resource group as the associated transmission related resource to be reported. In some embodiments, the first parameter may be sent by the gNB to the UE. In some other embodiments, the gNB may send a threshold value corresponding to the first parameter so that when the UE determines that the first parameter is greater than (or larger than) or equal to or is not less than a threshold, at least one IMR can be selected from the same resource group as the associated transmission related resource to be reported.

(ii) a second parameter to determine that at least one IMR can be selected from the different resource group than a resource group of the associated transmission related resource to be reported. In some embodiments, the second parameter may be sent by the gNB to the UE. In some other embodiments, the gNB may send a threshold value corresponding to the second parameter so that when the UE determines that the second parameter is greater than or equal to a corresponding threshold value.

(iii) a third parameter to indicate whether one IMR can be selected from one IMR group, which is associated with the associated CMR to be reported or which is associated with one CMR group to be reported. In some embodiments, the third parameter may be sent by the gNB to the UE. In some other embodiments, the gNB may send a threshold value corresponding to the third parameter so that when the UE determines that the third parameter is greater than or equal to or is not less than a threshold, one IMR can be selected from one IMR resource group, which is associated with the associated CMR to be reported or which is associated with the CMR group of the associated CMR to be reported.

(iv) a fourth parameter to determine that at least one IMR can be selected from one IMR group, where the resource group is not associated with at least one CMR to be reported or which is not associated with the CMR group of the associated CMR to be reported. In some embodiments, the fourth parameter may be sent by the gNB to the UE. In some other embodiments, the gNB may send a threshold value corresponding to the fourth parameter so that the UE determines that the fourth parameter is greater than or equal to a corresponding threshold value.

One or more threshold values associated with or corresponding to any one or more of the first, second, third, and fourth parameters listed above may be sent by the gNB to the UE using a reporting configuration, or a resource setting or one or more resource sets. For one CSI reporting, the UE selects at least one IMR based on a comparison between any one of the first, second, third, or fourth parameters and a corresponding threshold value. For example, if the first parameter is greater than or equal to or is not less than a threshold value, then the UE selects least one interference-related RS from the same resource group as the associated transmission related RS.

In some embodiments, a UE may determine whether or not to include one or more CMRs in the generated report according to any one of the following rules (the first to fourth parameter listed below may be different from the first to fourth parameters mentioned above for selecting an IMR for the report):

(i) a first parameter to determine that the at least one CMR is selected from a same resource group as at least one IMR.

(ii) a second parameter to determine that the at least one CMR is selected from a first resource group different than a second resource group belonging to the at least one IMR, (iii) a third parameter to determine that the at least one CMR is selected from one CMR group from the one or more CMR groups, where the one CMR group is associated with the at least one IMR, or is associated with one IMR group.

(iv) a fourth parameter to determine that the at least one CMR is selected from one CMR group from the one or more CMR groups, where the one CMR group is not associated with the at least one IMR, or is un-associated with one IMR group associated with at the least one IMR.

In some embodiments, the first, second, third or fourth parameters are received by the communication node. In some other embodiments, the at least one CMR is included in the report in response to a value of the first parameter, second parameter, third parameter, or fourth parameter being greater than or equal to a corresponding threshold value.

In some embodiments, the one or more IMRs resources from one resource group (e.g., same reporting setting, same CSI resource setting or same CSI resource set) may be associated with the same CPA. In embodiments where the one or more IMRs from one resource group are associated with a same CPA, each of the one or more IMRs are associated with different spatial domain filters. In some other embodiments, any one or more of IMRs may not be associated with any CPA. In some embodiments, each of the IMRs are associated with one or more different beams.

2. Scheme for indicating IR-beam(s) for one TR-beam: The DL resource indexes for IR-beams can be provided by the UE to the gNB in one report instance, directly. But, taking into account the plurality of IR-beams may be reported, for the sake of saving reporting overhead, the bitmap scheme can be used. For example, one or more identifiers associated with one or more CMR or one or more IMR may be reported using a bitmap. In some embodiments, a list of one or more CMRs is reported and associated with one IMR, e.g., a bitmap for CMRs. In some embodiments, a list of one or more IMRs are reported and associated with one CMR, e.g., a bitmap for IMRs. In some embodiments, the length of the bitmap may be determined by the UE based on the number of resources for CMR or IMR associated with the reporting configuration, and each bit position may be associated with each resource. For example, a value in one bit, e.g., "1", may represent that the DL resource associated with the bit is IR-beam, otherwise, non-IR-beam. In some other embodiments, the length of the bitmap may be determined by a number of resources for CMR groups or IMR groups associated with the reporting configuration. For instance, each bit position in the bitmap may be associated with each group.

3. Configurable threshold for indicating reporting identifiers of at least one CMR or at least one IMR or at least one CMR group or at least one IMR group: A threshold for one or more IMR (and similarly for one or more CMR) may be in terms of one or more RSRP, one or more block error rate (BLER), or one or more BQI (e.g., one or more RSRQ or one or more SINR). The threshold can be configured by gNB. For instance, an identifier for an IMR or an identifier for an IMR group related to the IMR (and similarly for an identifier for the CMR or CMR group) can be included in the report based on the threshold rules described below.

In some embodiments, when the threshold is based on RSRP, any one of the following three features may be used: (1) the corresponding RSRP result is greater than or equal to threshold or is not less than the threshold; (2) the percentage of an RSRP of at least one IMR in reference to (or over) another RSRP of at least one CMR is greater than or equal to or not less than the threshold value; or (3) the RSRP difference between one CMR and one IMR is less than or equal to or not greater than the threshold.

In some other embodiments, when the threshold is based on RSRP, any one of the following three features may be used: (1) the corresponding RSRP result is less than or equal to threshold or is not greater than the threshold; (2) the percentage of an RSRP of one IMR in reference to (or over) another RSRP of one CMR is less than or equal to or not greater than the threshold value; or (3) the RSRP difference between one CMR and one IMR is greater than or equal to or not less than the threshold.

In some other embodiments, when the threshold value is based on one or more BLER, a first value associated with the BLER is determined based on at least one CMR and at least one IMR, and a second value associated with the BLER is determined based on the at least one CMR, where the difference between the first value and the second value is greater than or equal to the threshold value. In some implementations, when the threshold value associated with one or more BLER, one value associated with the BLER is determined based on at least one CMR and at least one IMR, where the one value is greater than or equal to the threshold value.

In yet some other embodiments, when the threshold value is based on one or more BLER, a first value associated with the BLER is determined based on at least one CMR and at least one IMR, and a second value associated with the BLER is determined based on the at least one CMR, where the difference between the first value and the second value is less than or equal to or not greater than the threshold value. In some implementations, when the threshold value associated with one or more BLER, one value associated with the BLER is determined based on at least one CMR and at least one IMR, where the one value is less than or equal to or not greater than the threshold value.

In some other embodiments, when the threshold is based on BQI, an identifier corresponding to one IMR is provided by the UE in a report if the difference of measurement results for BQI between the associated CMR without considering the IMR and the measurement result for BQI for the associated CMR with considering the IMR is greater than or equal to or is not less than the threshold.

In yet some other embodiments, when the threshold is based on BQI, an identifier corresponding to one IMR is provided by the UE in a report if the difference of measurement results for BQI between the associated CMR without considering the IMR and the measurement result for BQI for the associated CMR with considering the IMR is less than or equal to or is not greater than the threshold.

4. Configurable number for indicating reporting identifiers of at least one CMR or at least one IMR or at least one CMR group or at least one IMR group in terms of one specified objective, e.g., maximizing RSRQ or SINR. In some embodiments, one CMR and multiple IMRs (beams from candidate pairing UE) are configured to UEs for SINR or RSRQ reporting and then the UE may select the best-M1 IMRs and reports the IDs of corresponding IMRs and the corresponding best-M1 SINR or RSRQ values, where M1 is a positive integer. The UE determines the set of one or more best IMRs (e.g., best-M1 IMRs) by determining that the SINR or RSRQ values associated with the one or more IMRs is greater than a first threshold value. In some embodiments, the UE may select the worst-M2 IMRs and reports the IDs of corresponding IMRs and the corresponding worst-M2 SINR or RSRQ values, where M2 is a positive integer. The UE determines the set of one or more worst IMRs (e.g., worst-M2 IMRs) by determining that the SINR or RSRQ values associated with the one or more IMRs is lower than a second threshold value or is lower than the first threshold value.

In some other embodiments, multiple CMRs and one IMR are configured to UEs for SINR or RSRQ reporting and then the UE pick the best-M CMRs and reports the IDs of corresponding CMRs and the corresponding best-M SINR or RSRQ values.

In some other embodiments, multiple CMRs and multiple IMRs are configured to UEs for SINR or RSRQ reporting and then the UE pick the best-M combination of (CMR, IMR) and reports the IDs of corresponding CMRs and IMRs and the corresponding best-M SINR or RSRQ values.

In yet some other embodiments, multiple CMRs are configured to UEs for SINR or RSRQ reporting and then UE pick the best-M combination of (CMR-1, CMR-2, CMR-3, . . . CMR-K) and reports the IDs of CMRs and the corresponding K SINR or RSRQ values for each of the M combinations. Each of the SINR or RSRQ values is calculated based on the assumption that one of the CMR in the combination is the signal and the rest of CMRs in the combination are interference. Then the best-M combinations are selected based on a function (e.g. a sum of, or using exponential effective SINR mapping (EESM) algorithm, mutual information effective SINR Mapping (MI-ESM)) according to the K SINR values in each combination.

In some embodiments, in one interference-aware beam reporting instance, the UE generates a report by prioritizing the information for indicating TR-beam over the information for indicating IR-beam. For example, if a total number of bits for a generated report (e.g., total reporting information related to CMRs and IMRs) exceeds a maximum number of bits for the report, then the UE may drop or exclude at least some information related to IR-beam from the report prior to removing at least some (or any) information related to TR-beam from the report as part of a "dropping rule." In another example, the information for indicating IR-beam (e.g., the resource index corresponding to IR-beam) is contained in one low-priority part included in the report generated by the UE (e.g., in CSI part-2), but, the information for indicating TR-beam (e.g., the resource index corresponding to TR-beam) is contain in one high-priority part included in the generated report (e.g., in CSI part-1).

III. Embodiment #3—Interference-Aware Beam Reporting in One TRP with Multiple Panels When interference-aware beam reporting is enabled (for instance, one UE is configured with the reporting setting with the higher layer parameter "reportQuantity" set to 'cri-SINR' or 'ssb-Index-SINR'), the TR-beam and its associated IR-beam, if satisfying the configured threshold for TR-beam or IR-beam measurement, are reported accordingly by the UE.

In embodiments involving one TR-beam ID, the reporting format can be {TR-beam-ID, BQI} if there is no IR-beam for the reported TR-beam. In embodiments involving some IR-beams to be reported with one TR-beam, the BQI to be determined by both TR-beam-ID and each of the associated IR-beam can be reported, respectively, besides indexes for IR-beam(s), so that the reporting format can be {TR-beam-ID, BQI, {IR-beam-1, BQI-1}, . . . , {IR-beam-N, BQI-N}}. In some other embodiments, if there are some IR-beams for the reported TR-beam, only IR-beam(s) associated with the TR-beam are reported.

In embodiments involving one TRP with multiple panels, one CSI reporting setting is associated with one resource setting, and the resource setting contains only one CSI resource set. However, for one given time, the TRP can simultaneously transmit more than one Tx beam, which means that MU-MIMO can be supported by the TRP. Consequently, the interference-aware beam reporting can be enabled by TRP.

Figure 3:
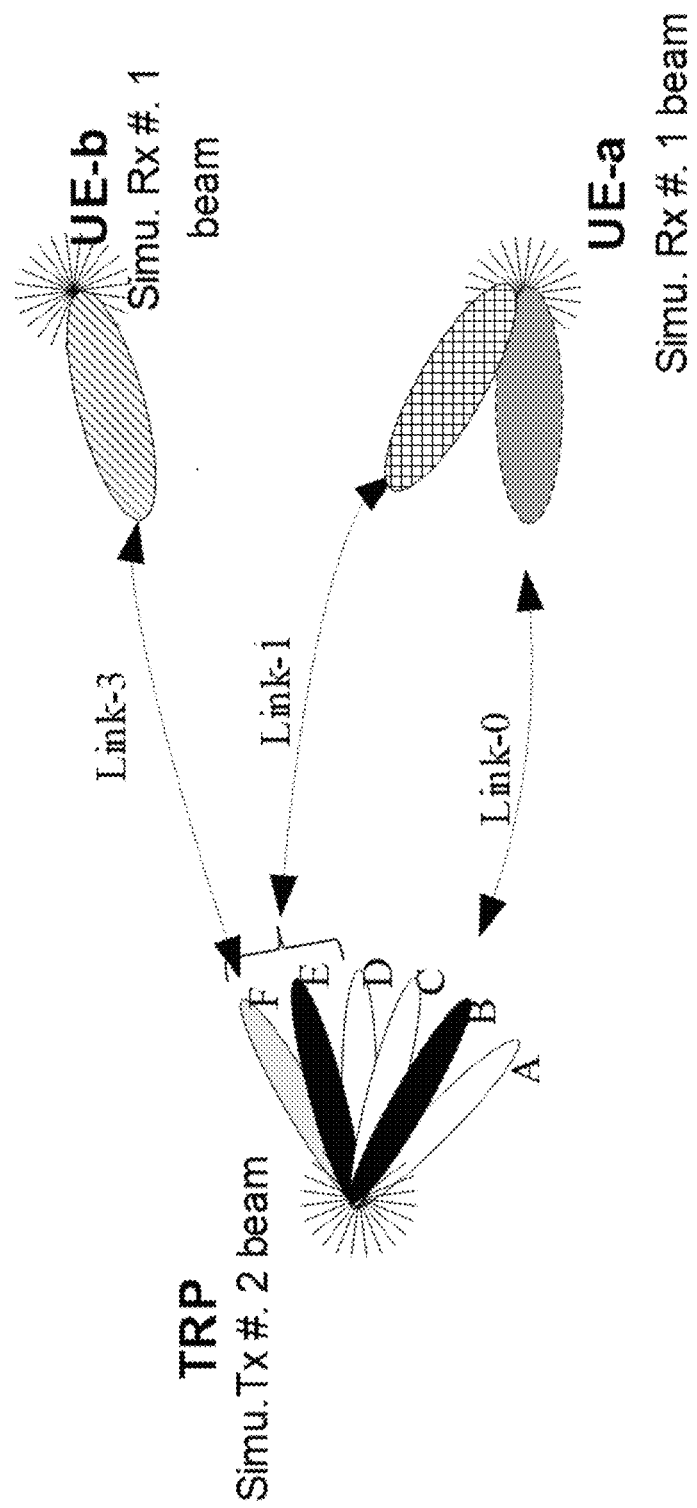
FIG. 3 shows an example of one TRP communicating with two user equipment, where each user equipment has multiple panels.

FIG. 3 shows an example of one TRP with multiple panels of each UE where up to two TX beams can be simultaneously transmitted by one TRP, and only one RX beam can be simultaneously generated by separate UE sides at a given time. The numbers of RX beams that can be generated simultaneously can be provided as one kind of UE capability signaling. In some embodiments, the number of RX beams can be derived from another UE capability. For instance, only one RX beam to be generated simultaneously can be represented by the UE to the gNB by sending a capability information of "group based reporting is not support."

In FIG. 3, for UE-a, an example reporting format is shown in the Table 1, where the BQI values is determined by the UE according to one TR-beams and its one associated IR-beams, except that the BQI value associated with only TR-beam may be reported.

In FIG. 3, for UE-b, there is no IR-beams according to reporting configuration, e.g., based on the threshold for IR-beam determination. The example reporting format is shown in the Table-2.

Therefore, for the subsequent transmission, one DL channel (e.g., physical downlink shared channel (PDSCH) or physical downlink control channel (PDCCH)) using Beam-B and one DL channel using Beam-F can be transmitted by using some same time, frequency and coding resources are transmitted to the UE-a and UE-b, respectively. But, if using Beam-E and Beam-F simultaneously for the corresponding UEs, respectively, some performance degradation for UE-a can be observed accordingly.

TABLE 1

| | Reporting from UE-a | | | |
|---|---|---|---|---|
| | TR-Beam | BQI (e.g., SINR) | IR-Beam | BQI (e.g., SINR) |
| Reporting contents | B<br>E | 12 dB<br>10 dB | —<br>F | —<br>8 dB |

TABLE 2

| | Reporting from UE-b | | | |
|---|---|---|---|---|
| | TR-Beam | BQI (e.g., SINR) | IR-Beam | BQI (e.g., SINR) |
| Reporting contents | F | 9 dB | — | — |

IV. Embodiment #4—Interference-Aware Beam Reporting in Multi-TRP and Multi-Panel Embodiments In embodiments involving multiple TRP with multiple panels, one CSI reporting setting can be associated with one resource setting, where the resource setting can contain more than one CSI resource set. However, for one given time, the Tx beams from different TRP can be simultaneously transmitted naturally. Consequently, for supporting the MU-MIMO or simultaneous transmission between different TRP for different UE, the interference-aware beam reporting can be enabled for indicating some potential IR-beams associated with TR-beam.

Figure 4:
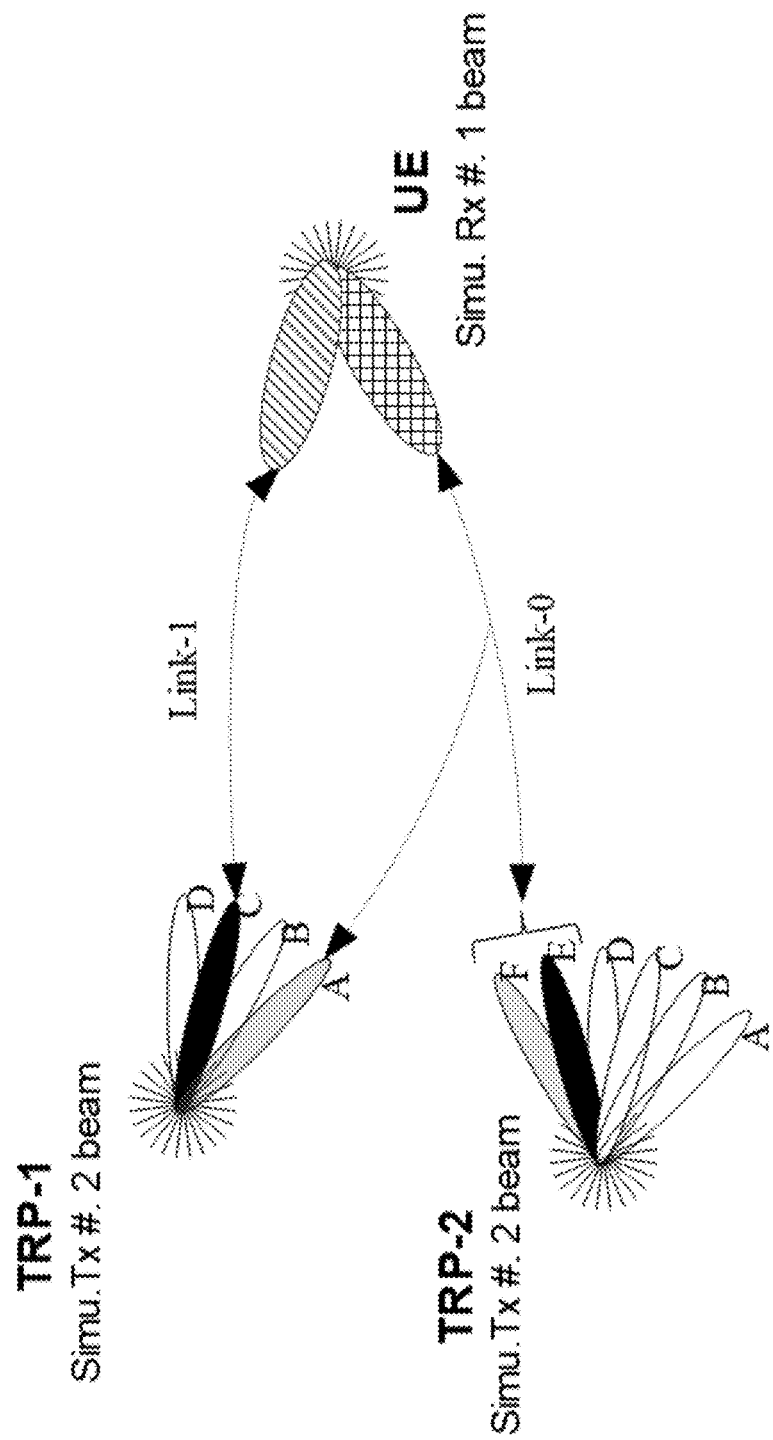
FIG. 4 shows an example of multiple TRP communicating with two user equipment, where each user equipment has multiple panels.

FIG. 4 shows an example of multiple TRP with multiple panels where up to two TX beams can be simultaneously transmitted by one TRP, but for one UE, only one RX beams can be simultaneously generated at a given time. Thus, only one TX beam can be used for this UE corresponding data transmission. For UE, an example reporting format is shown in the Table 3, where the BQI values determined by the UE according to one TR-beams and its one associated IR-beams, except that the BQI value associated with only TR-beam may be reported.

Notice that the IR-beam can be selected from different TRP, i.e., resources from different CSI resource set, besides the TRP related to the associated TR-beam.

TABLE 3

| | Reporting from UE | | | | | |
|---|---|---|---|---|---|---|
| | TR-Beam | BQI (e.g., SINR) | IR-Beam | BQI (e.g., SINR) | IR-Beam | BQI (e.g., SINR) |
| Reporting contents | TRP1-C (e.g., CSI resource set ID-1 + resource ID-C) | 12 dB | — | — | — | — |
| | TRP2-E (e.g., CSI resource se tID-1 + resource ID-E) | 10 dB | TRP2-F (e.g., CSI resource se tID-2 + resource ID-F) | 8 dB | TRP1-A (e.g., CSI resource set ID-1 + resource ID-A) | 7 dB |

V. Embodiment #5—IMR Based Interference-Aware Beam Reporting

For supporting IMR besides CMR, more than one CSI resource setting is associated with one CSI reporting setting (as shown in FIG. 2B), where one or more resource setting is configured with one or more IMRs. In some embodiments, if two CSI resource settings are configured for IM, one CSI resource setting can contain CSI-IM (e.g., one type of ZP-CSI-RS as IMR), and the other CSI resource setting can contain NZP CSI-RS, which can emulate the potential interference source.

Figure 5:
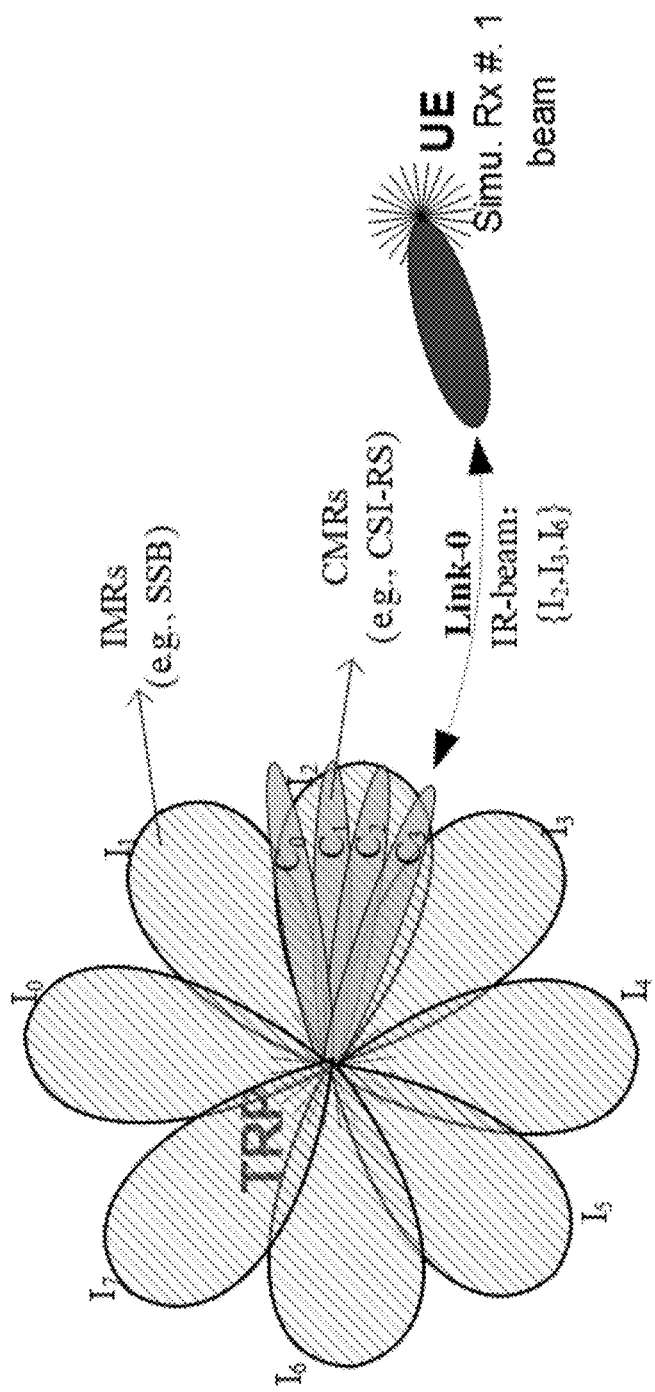
FIG. 5 shows an example of an interference measurement reference signal based interference-aware beam reporting.

Therefore, for one beam reporting, the one or more IR-beams are selected from the one or more IMR sets. Furthermore, one IMR can be configured or associated with its corresponding CPA, but, for BQI or IR-beam determination, one UE may use the same Rx beam or group for receiving the associated TR-beam, rather than determining Rx beams according to the configured or associated CPA, if any. FIG. 5 shows an example of an IMR-based interference-aware beam reporting.

In some embodiments, for saving reporting overhead, following example schemes may be used:

1. Bitmap format for indicating IR-beam(s): In some embodiments, the length of the bitmap may be determined by the UE based on the number of candidate DL RS(s) for IR-beam, and each bit position is associated with each entry of candidate DL RS(s), respectively. For example, a value in one bit, e.g., "1", may represent that the DL RS associated with the bit is IR-beam, otherwise, non-IR-beam. In some other embodiments, the length of the bitmap may be determined by a number of resources for CMR groups or IMR groups associated with the reporting configuration. For instance, each bit position in the bitmap may be associated with each group.

2. Only IMR set ID may be reported rather than to indicating the specific resource ID, where the additional noise and interference power contribution (in Watts) from one or more IMRs can be determined over all resources of IMR set, e.g., the linear average of the received power of all resource elements from the set. For UE, according to the example shown in FIG. 5, one reporting result is shown in the Table 4, where BQI values are provided only based on TR-beam, but IR-beam determination can depend on the configured threshold.

For instance, the threshold in terms of RSRP is to restrict UE from providing IR-beam information in cases where the UE determined RSRP for IR-beam is not less than or equal to or is greater than a certain percent over the RSRP of the TR-beam, e.g., 10% RSRP, over its associated TR-beam.

TABLE 4

| | Reporting from UE | | |
|---|---|---|---|
| | TR-Beam | BQI (e.g., SINR) | IR-Beam |
| Reporting contents | C3 | 12 dB | 8'b0011_0010 (i.e., $I_2$, $I_3$ and $I_6$ from CSI resource set containing one or more IMRs) |

VI. Embodiment #6—Joint Interference-Aware and Group Based Beam Reporting

When UE has more than one panel, more than one DL Tx beams can be simultaneously received by UE sides. Consequently, the UE may perform group-based reporting by reporting which Tx beams can be received simultaneously. There are two kinds of group-based reporting: beam group based reporting and antenna group based reporting. The criterion for grouping has been described above in Embodiment #1.

Figure 6:
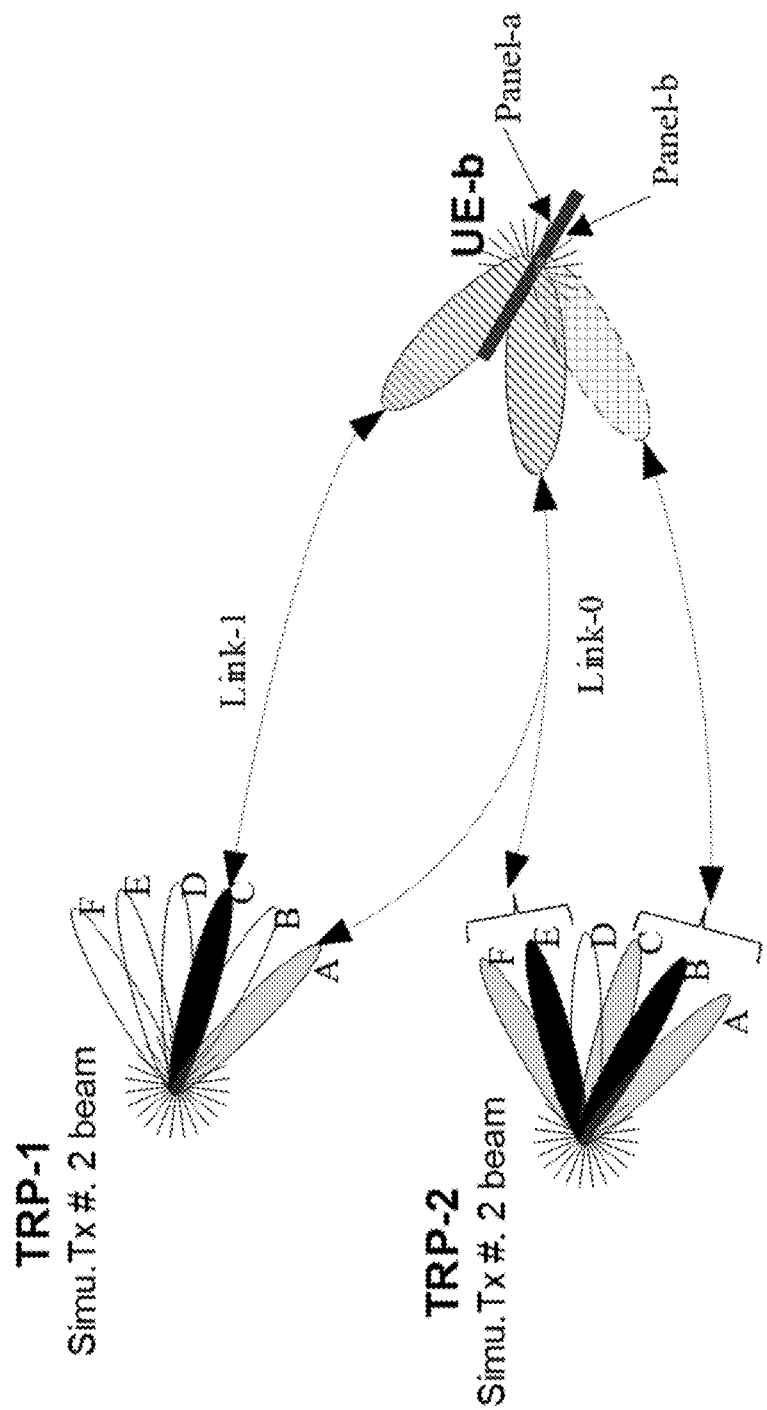
FIG. 6 shown an example for joint interference-aware and group based beam reporting.

FIG. 6 shown an example for joint interference-aware and group based beam reporting. For antenna group based reporting, TR-beams are grouped per UE-side antenna group, e.g., group-0 {TRP-1 Beam C} and group-1 {TRP-2 Beam-E, TRP-2 Beam-B}. Consequently, IR beams associated with one TR-beam can be determined by the UE by the associated UE-side antenna group.

According to the example shown in FIG. 6, one reporting result based on antenna grouping is shown in the Table 5. For beam group based reporting, TR-beams are grouped per UE-side Rx beam group, e.g., group-0 {TRP-1 Beam C, TRP-2 Beam-B} and group-1{TRP-1 Beam-C, TRP-2 Beam-E}. The IR beams can be determined by the UE according to one UE Rx beam which is also used for receiving the associated TR-beam, or all UE Rx beams within the group.

TABLE 5

Antenna group based reporting from UE

| | Group ID | TR-Beam | BQI (e.g., SINR) | IR-Beam | BQI (e.g., SINR) | IR-Beam | BQI (e.g., SINR) |
|---|---|---|---|---|---|---|---|
| Reporting contents | 0 | TRP1-C (i.e., CSI resource set ID-1 + RS ID-C) | 12 dB | — | — | — | — |
| | 1 | TRP2-E (i.e., CSI resource set ID-1 + RS ID-E) | 10 dB | TRP2-F (i.e., CSI resource set ID-2 + RS ID-F) | 8 dB | TRP1-A (i.e., CSI resource set ID-1 + RS ID-A) | 7 dB |
| | | TRP2-B (i.e., CSI resource set ID-1 + RS ID-B) | 9 dB | TRP2-A (i.e., CSI resource set ID-2 + RS ID-A) | 6 dB | TRP2-C (i.e., CSI resource set ID-2 + RS ID-C) | 7 dB |

According to the example shown in FIG. 6, one reporting result based on beam grouping is shown in the Table 6, where the BQI values for all Rx beam may be used and provided to the gNB by the UE in a report.

Some candidate descriptions for IR-beam determination can be found in the Embodiment #2.

TABLE 6

Beam group based reporting from UE

| | Group ID | TR-Beam | BQI (e.g., SINR) | IR-Beam | BQI (e.g., SINR) | IR-Beam | BQI (e.g., SINR) |
|---|---|---|---|---|---|---|---|
| Reporting contents | 0 | TRP1-C (i.e., CSI resource set ID-1 + resource ID-C) | 12 dB | TRP2-A (i.e., CSI resource set ID-2 + resource ID-A) | 12 dB | TRP2-C (i.e., CSI resource set ID-2 + resource ID-C) | 11 dB |
| | | TRP2-B (i.e., CSI resource set ID-1 + resource ID-B) | 9 dB | | 6 dB | | 7 dB |
| | 1 | TRP1-C (i.e., CSI resource set ID-1 + resource ID-C) | 12 dB | TRP2-F (e.g., CSI resource set ID-2 + resource ID-F) | 12 dB | TRP1-A (i.e., CSI resource set ID-1 + resource ID-A) | 12 dB |
| | | TRP2-E (i.e., CSI resource set ID-1 + resource ID-E) | 10 dB | | 8 dB | | 7 dB |

Figure 7:
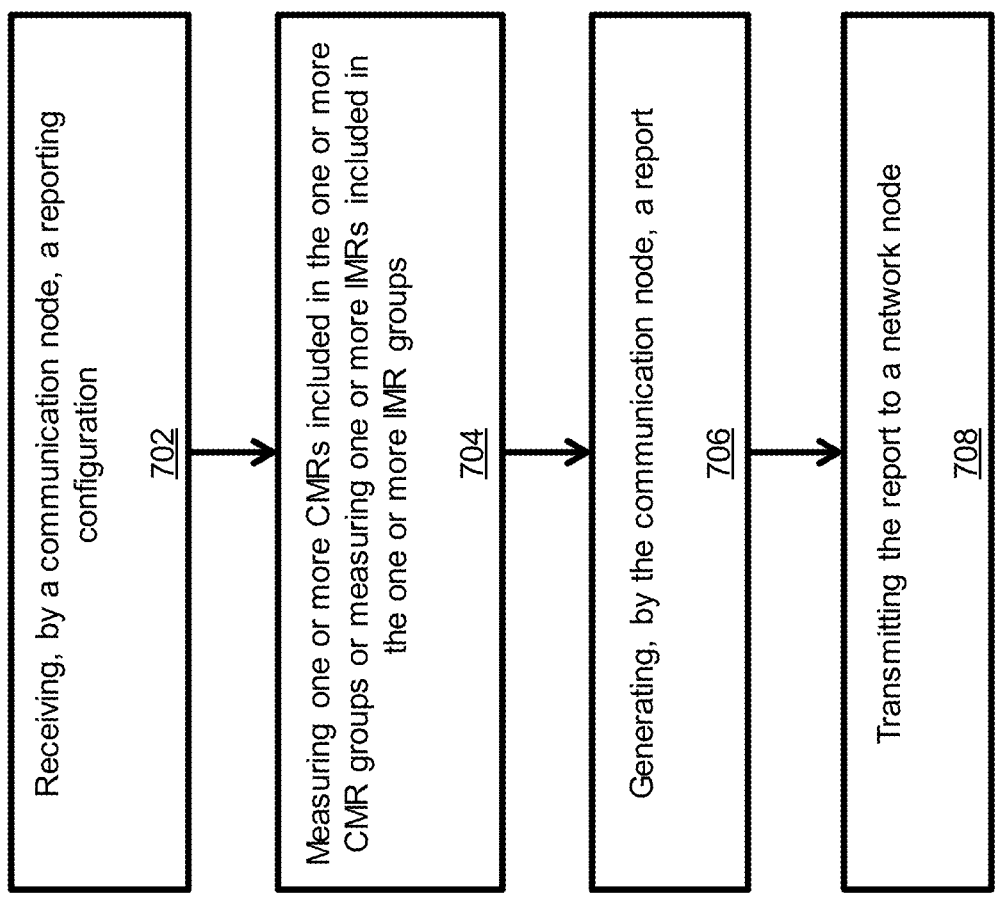
FIG. 7 shows exemplary flowchart implemented at a user equipment to generate a report.

FIG. 7 shows exemplary flowchart implemented at a user equipment to generate a report. At the receiving operation 702, a communication node receives a reporting configuration. The reporting configuration is associated with one or more channel measurement resource (CMR) groups or one or more interference measurement resource (IMR) groups.

At the measuring operation 704, the communication node measures one or more CMRs included in the one or more CMR groups or measures one or more IMRs included in the one or more IMR groups. The measuring operation 704 and the receiving operation 702 may be performed at the same time or one after at the other. For example, the receiving operation 702 may be performed before the measuring operation 704 or the receiving operation 702 may be performed after the measuring operation 704.

At the generating operation 706, the communication node generates a report that includes: one or more channel state information (CSI) values that describe signal-to-interference-plus-noise ratio (SINR) or reference signal received quality (RSRQ), or one or more identifiers associated with the at least some of one or more CMRs, at least some of the one or more IMRs, at least some of the one or more CMR groups, or at least some of the one or more IMR groups. The one or more CSI values are determined based on the measuring of at least some of the one or more CMRs or at least some of the one or more IMRs. In some embodiments, an identifier associated with one or more CMRs may be equivalent to a CMR group ID and an identifier associated with one or more IMRs may be equivalent to an IMR group ID. The group ID may be considered a special case of an identifier associated with one or more CMRs or one or more IMRs. When all resources within one group are reported in one report instance, one ID for the group rather than multiple IDs for each resource may be reported.

At the transmitting operation 708, the communication node transmits the report to a network node.

Figure 8:
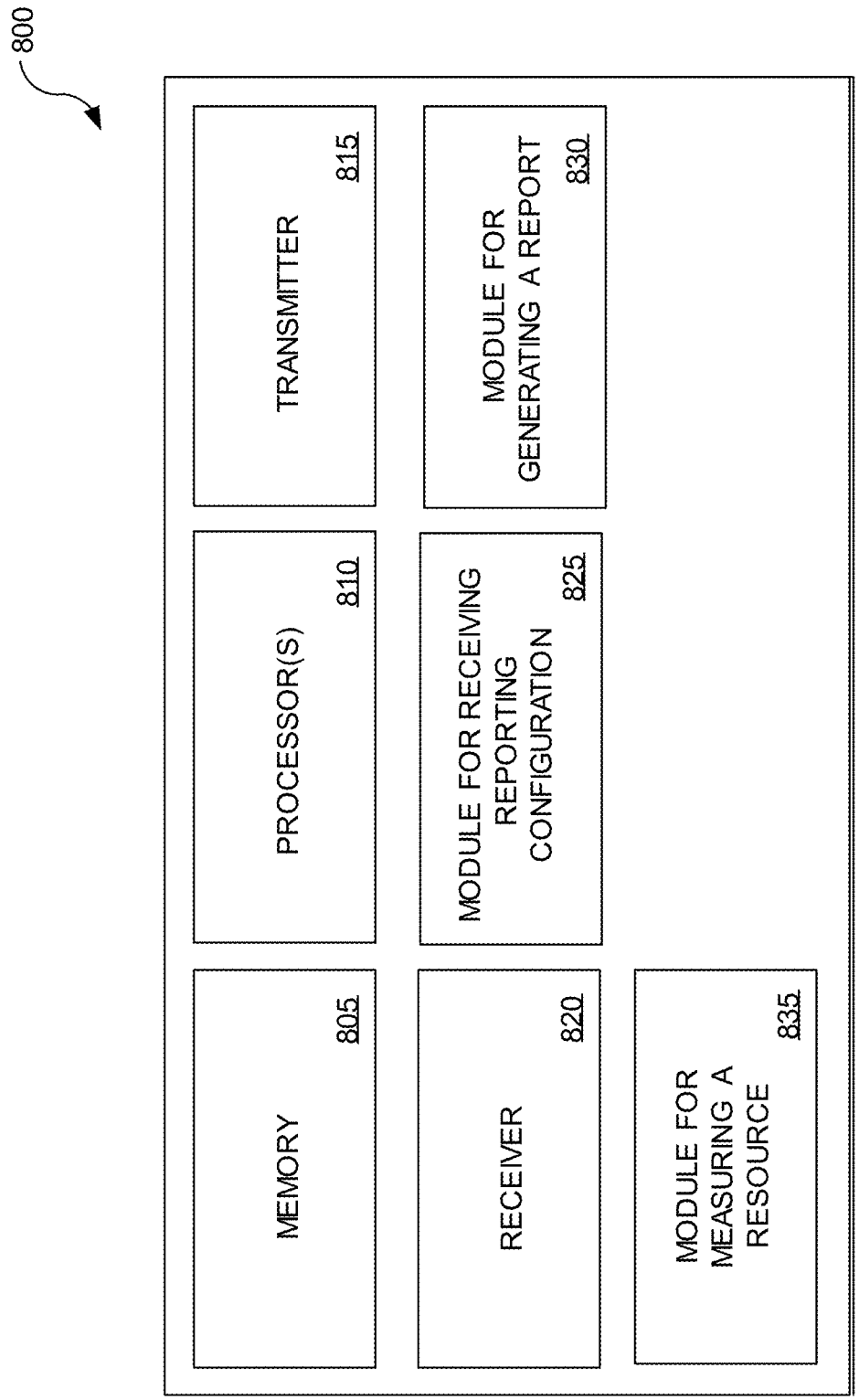
FIG. 8 shows a block diagram for an exemplary user equipment to generate a report.

FIG. 8 shows a block diagram for an exemplary user equipment to generate a report. The user equipment 800 includes at least one processor 810 and a memory 805 having instructions stored thereupon. The instructions upon execution by the processor 810 configure the user equipment 800 to perform several operations using the various modules of FIG. 8. The transmitter 815 transmits the information or data to a network node, such as a gNB. The receiver 820 receives the information or data transmitted by the network node. The module for receiving reporting configuration 825 receives a reporting configuration that indicates one or more channel measurement resource (CMR) groups or one or more interference measurement resource (IMR) groups. The module for measuring a resource 835 measures one or more CMRs in the one or more CMR groups or measures one or more IMRs in the one or more IMR groups.

The module for generating a report 830 may generate a report. The report may include (a) one or more CSI values and/or (b) one or more identifiers associated with at least some of the one or more CMRs, at least some of the one or more IMRs, at least some of the one or more CMR groups, or at least some of the one or more IMR groups. The one or more CSI values describe SINR or RSRQ. The module for measuring a resource may determine the one or more CSI values based on the measuring of at least the one or more CMRs or the one or more IMRs. The generated report can be transmitted via the transmitter 815 to a network node, such as a gNB. One or more blocks for FIG. 8 can perform the operations described for FIG. 7.

Figure 9:
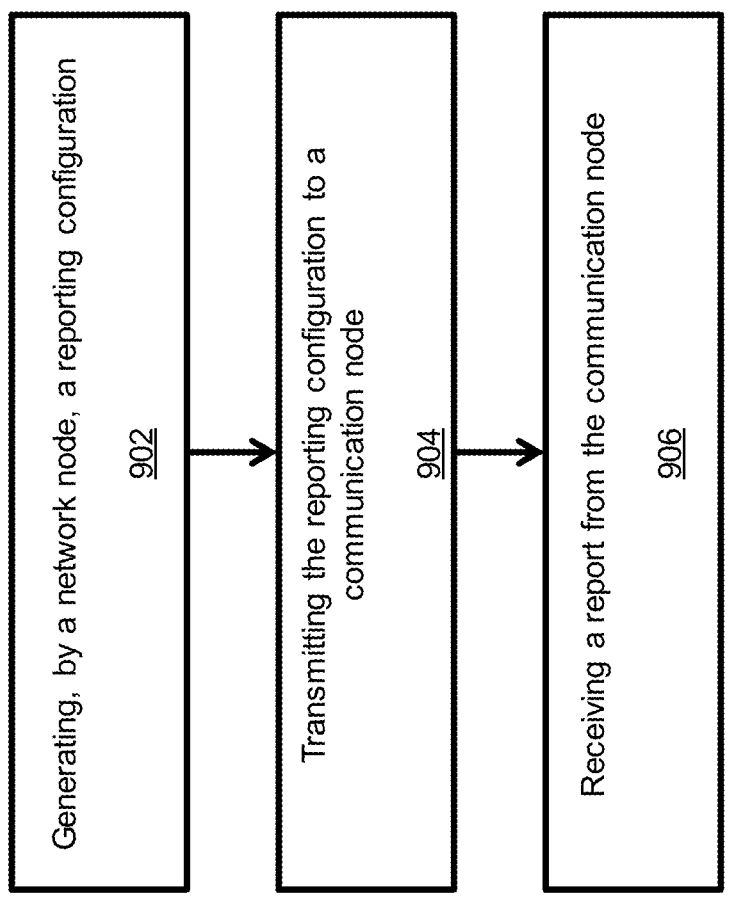
FIG. 9 shows exemplary flowchart implemented at a base station to receive a report.

FIG. 9 shows exemplary flowchart implemented at a base station to receive a report. At the generating operation 902, a network node generates a reporting configuration. The reporting configuration indicates one or more channel measurement resource (CMR) groups or one or more interference measurement resource (IMR) groups, where the one or more CMR groups includes one or more CMRs, and where the one or more IMR groups includes one or more IMRs.

At the transmitting operation 904, the network node transmits the reporting configuration to a communication node.

At the receiving operation 906, the network node receives a report from the communication node after the transmitting of the reporting configuration. The report includes: (a) one or more CSI values that describe SINR or RSRQ, or (b) one or more identifiers associated with the at least some of one or more CMRs, at least some of the one or more IMRs, at least some of the one or more CMR groups, or at least some of the one or more IMR groups. The one or more CSI values are determined based on at least the one or more CMRs or the one or more IMRs.

FIGS. 7 and 9 are associated with operations or technical features as described below.

In some embodiments, an interference measurement for at least one CSI value are obtained based on at least one IMR. In some embodiments, at least one IMR included in the report is associated with a first channel that has low correlation or low interference level with another channel of at least one CMR, or at least one CMR included in the report is associated with a second channel that has low correlation or low interference level with another channel of at least one IMR. In some embodiments, at least one IMR or at least one CMR included in the report is associated with one rank indicator (RI), wherein the one RI is included in the report or configured for the report.

In some embodiments, the one or more CSI values are further based on: one or more channel property assumption (CPA), one or more antenna groups, or one or more beam groups. In some embodiments, the CPA may include quasi co-location (QCL) information, a transmission configuration indication (TCI), a spatial filter, or a reference signal set that includes one or more reference signals and one or more QCL type parameters. In some embodiments, one or more IMRs in one IMR group from the one or more IMR groups are associated with a same CPA. In some other embodiments, any one of one or more IMRs in one IMR group from the one or more IMR groups is not associated with a CPA.

In some embodiments, the one or more IMRs include one or more reference signal resources for channel measurement or one or more resources for interference measurement. In some embodiments, the one or more CMRs include one or more reference signal resources for channel measurement. In some embodiments, each IMR in one IMR group from the one or more IMR groups is associated with different spatial domain filters. In some embodiments, at least one CSI is associated with the one or more identifiers associated with at least some of the one or more IMRs or at least some of the one or more IMR groups.

In some embodiments, the one or more CSI values are determined based on any one option from following set of report options: one or more CMRs and one or more antenna groups; one or more CMRs and one or more beam groups; one or more CMRs, one or more antenna groups, and one or more beam groups; one or more CMRs, one or more IMRs, and one or more antenna groups; one or more CMRs, one or more IMRs, and one or more beam groups; and one or more CMRs, one or more IMRs, one or more antenna groups, and one or more beam groups. In some embodiments, the one option is identified based on the reporting configuration, a CSI resource setting sent by the network node, or a measurement setting sent by the network node.

In some embodiments, at least one CMRs and at least one IMRs are associated with at least one CSI value. In some embodiments, at least one CMRs and at least one IMRs are measured using a same receive beam, a same antenna group, or a same receive beam group. In some embodiments, at least one CMR and at least one IMR are received simultaneously by the communication node.

In some embodiments, at least one IMR in the report or at least one IMR group in the reporting configuration is associated with: at least one CMR in the report or at least one CMR associated with the reporting configuration, or at least one CMR group in the report or at least one CMR group associated with the reporting configuration.

In some embodiments, at least one IMR is included in the report based on any one of following: a first parameter to determine that at least one IMR is selected from a same resource group as at least one CMR; a second parameter to determine that at least one IMR is selected from a first resource group different than a second resource group belonging to at least one CMR; a third parameter to determine that at least one IMR is selected from one IMR group from the one or more IMR groups, wherein the one IMR group is associated with at least one CMR, or is associated with one CMR group; and a fourth parameter to determine that at least one IMR is selected from one IMR group from the one or more IMR groups, wherein one IMR group is not associated with at least one CMR, or is un-associated with one CMR group associated with at the least one CMR. In some embodiments, the first, second, third or fourth parameters are received by the communication node. In some other embodiments, the at least one IMR is included in the report in response to a value of the first parameter, second parameter, third parameter, or fourth parameter being greater than or equal to a corresponding threshold value.

In some embodiments, at least one CMR is included in the report based on any one of following: a first parameter to determine that at least one CMR is selected from a same resource group as at least one IMR; a second parameter to determine that at least one CMR is selected from a first resource group different than a second resource group belonging to at least one IMR; a third parameter to determine that at least one CMR is selected from one CMR group from the one or more CMR groups, wherein the one CMR group is associated with at least one IMR, or is associated with one IMR group; and a fourth parameter to determine that at least one CMR is selected from one CMR group from the one or more CMR groups, wherein the one CMR group is not associated with at least one IMR, or is un-associated with one IMR group associated with at the least one IMR. In some embodiments, the first, second, third or fourth parameters are received by the communication node. In some other embodiments, the at least one CMR is included in the report in response to a value of the first parameter, second parameter, third parameter, or fourth parameter being greater than or equal to a corresponding threshold value.

In some embodiments, at least some of the one or more identifiers are included in a bitmap. In some embodiments, at least some of the one or more identifiers are reported using a bitmap. In some embodiments, a length of the bitmap is determined by a number of resources for CMRs or IMRs associated with the reporting configuration, where each bit position in the bitmap is associated with each resource. In some other embodiments, a length of the bitmap is determined by a number of resources for CMR groups or IMR groups associated with the reporting configuration, where each bit position in the bitmap is associated with each group.

In some embodiments, the one or more identifiers for the one or more IMRs, or the one or more CMRs, or the one or more IMR groups, or the one or more CMR groups are reported based on a rule-based threshold value associated with one or more reference signal received power (RSRP), one or more block error rate (BLER), one or more RSRQ or one or more SINR.

In some embodiments, the threshold value associated with one or more RSRP is based on one of following rules: the RSRP corresponding to at least one IMR is greater than or equal to the threshold value, a percentage of the RSRP corresponding to at least one IMR in reference to another RSRP of at least one CMR is greater than or equal to the threshold value, and a difference between an RSRP of at least one CMR and another RSRP of at least one IMR is less than or equal to the threshold value. In some other embodiments, the threshold value associated with one or more RSRP is based on one of following rules: the RSRP corresponding to at least one IMR is less than or equal to the threshold value, a percentage of the RSRP corresponding to at least one IMR in reference to another RSRP of at least one CMR is less than or equal to the threshold value, and a difference between an RSRP of at least one CMR and another RSRP of at least one IMR is greater than or equal to the threshold value.

In some embodiments, the threshold value associated with one or more BLER is based on: a first value associated with the BLER determined based on at least one CMR and at least one IMR, and a second value associated with the BLER determined based on the at least one CMR, where the difference between the first value and the second value is greater than or equal to the threshold value. In some embodiments, the threshold value associated with one or more BLER is based on: one value associated with the BLER determined based on at least one CMR and at least one IMR, where the one value is greater than or equal to the threshold value.

In some other embodiments, the threshold value associated with one or more BLER is based on: a first value associated with the BLER determined based on at least one CMR and at least one IMR, and a second value associated with the BLER determined based on the at least one CMR, where the difference between the first value and the second value is less than or equal to the threshold value. In some other embodiments, the threshold value associated with one or more BLER is based on: one value associated with the BLER determined based on at least one CMR and at least one IMR, where the one value is less than or equal to the threshold value.

In some embodiments, the threshold value associated with the one or more RSRQ or the one or more SINR is based on a difference between a first value associated with one RSRQ or one SINR determined based on at least one CMR and at least one IMR, and a second value associated with the one RSRQ or the one SINR determined based on the at least one CMR, where the difference between the first value and the second value is less than or equal to the threshold value.

In some other embodiments, the threshold value associated with the one or more RSRQ or the one or more SINR is based on a difference between a first value associated with one RSRQ or one SINR determined based on at least one CMR and at least one IMR, and a second value associated with the one RSRQ or the one SINR determined based on the at least one CMR, where the difference between the first value and the second value is greater than or equal to the threshold value.

In some embodiments, the communication node generates the report by prioritizing a first set of information associated with the one or more CMRs over a second set of information associated with the one or more IMRs. In some embodiments, where at least some of the second set of information is excluded from the report, and where at least some of the first or the second set of information is excluded based on a total size of the first set of information and the second set of information exceeding a threshold value. In some embodiments, the first set of information is associated with a high-priority part included in the report, and where the second set of information is associated with a low-priority part included in the report.

In some embodiments, the identifiers are associated with a first set of one or more resources or a second set of one or more resources, where the first set of one or more resources are included in the report based on the SINR or RSRQ of each resource in the first set being greater than or equal to a first threshold value, and where the second set of one or more resources are included in the report based on the SINR or RSRQ of each resource in the second set being less than or equal to a second threshold value. In some embodiments, a number of combinations is included in the report, wherein each combination includes K1 IMRs, K2 IMR groups, K3 CMRs or K4 CMR groups, wherein K1, K2, K3 and K4 are positive integer. In some embodiments, each combination includes K3 CMRs or K4 CMR groups, wherein interference measurement for at least one CSI value associated with the one CMR or one CMR group in one combination included in the report are obtained based on another CMRs or another CMR groups in the one combination. In some embodiments, at least some of the one or more IMR included in the report and at least some of the one or more CMR included in the report are from a same one or more CMR groups.

Figure 10:
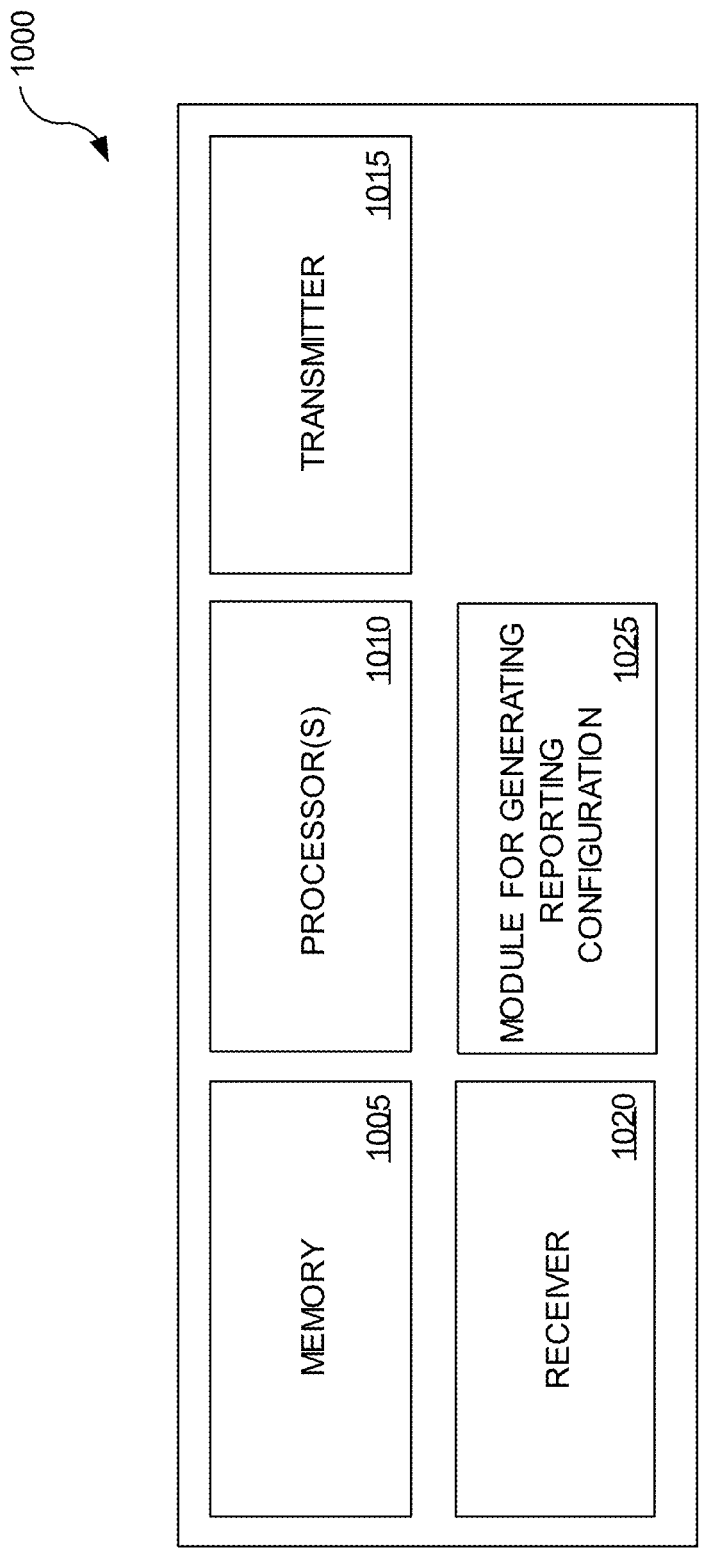
FIG. 10 shows a block diagram for an exemplary base station to receive a report.

FIG. 10 shows a block diagram for an exemplary base station to receive a report. The base station 1000 includes at least one processor 1010 and a memory 1005 having instructions stored thereupon. The instructions upon execution by the processor 1010 configure the base station 1000 to perform several operations using the various modules of FIG. 10. The transmitter 1015 transmits the information or data (e.g., reporting configuration) to a communication node, such as a UE. The receiver 820 receives the information or data (e.g., a report) transmitted by the communication node. The module for generating reporting configuration 825 generates a reporting configuration that indicates to the UE one or more channel measurement resource (CMR) groups or one or more interference measurement resource (IMR) groups. One or more blocks for FIG. 10 can perform the operations described for FIG. 9.

In this document, the term "exemplary" is used to mean "an example of" and, unless otherwise stated, does not imply an ideal or a preferred embodiment. In this document, the term "simultaneously" may refer to, for example, resources such as CMR or IMR transmitted or received in one given time.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
  receiving, by a communication node, a reporting configuration, wherein the reporting configuration is associated with a channel measurement resource (CMR) group and an interference measurement resource (IMR) group, wherein each IMR in the IMR group is associated with different spatial domain filters; and
  transmitting, by the communication node, a report,
    wherein the report includes a channel state information (CSI) value that describes signal-to-interference-plus-noise ratio (SINR), wherein the CSI value is determined by performing channel measurement on a CMR in a CMR group, and
  wherein the report includes one or more identifiers associated with one or more CMRs from the CMR group.

2. The method of claim 1, wherein an interference measurement for at least one CSI value is obtained based on at least one IMR.

3. The method of claim 1, wherein an IMR includes a resource for interference measurement.

4. A wireless communication apparatus, comprising a memory and a processor, wherein the processor reads code from the memory and implements a method comprising:
  receive a reporting configuration, wherein the reporting configuration is associated with a channel measurement resource (CMR) group and an interference measurement resource (IMR) group, wherein each IMR in the IMR group is associated with different spatial domain filters; and
  transmit a report,
    wherein the report includes a channel state information (CSI) value that describes signal-to-interference-plus-noise ratio (SINR), wherein the CSI value is determined by channel measurement performed on a CMR in a CMR group, and wherein the report includes one or more identifiers associated with one or more CMRs from the CMR group.

5. The wireless communication apparatus of claim 4, wherein an interference measurement for at least one CSI value is obtained based on at least one IMR.

6. The wireless communication apparatus of claim 4, wherein an IMR includes a resource for interference measurement.

7. The method of claim 1, wherein at least one CMRs and at least one IMRs are associated with at least one CSI value.

8. The method of claim 1, wherein the IMR group in the reporting configuration is associated with the CMR group associated with the reporting configuration.

9. The wireless communication apparatus of claim 4, wherein at least one CMRs and at least one IMRs are associated with at least one CSI value.

10. The wireless communication apparatus of claim 4, wherein the IMR group in the reporting configuration is associated with the CMR group associated with the reporting configuration.

11. A non-transitory computer readable program storage medium having code stored thereon, the code, when executed by a processor, causing the processor to implement a method, comprising:
 receiving, by a communication node, a reporting configuration, wherein the reporting configuration is associated with a channel measurement resource (CMR) group and an interference measurement resource (IMR) group, wherein each IMR in the one IMR group is associated with different spatial domain filters; and
 transmitting, by the communication node, a report,
  wherein the report includes a channel state information (CSI) value that describes signal-to-interference-plus-noise ratio (SINR), wherein the CSI value is determined by performing channel measurement on a CMR in a CMR group, and
  wherein the report includes one or more identifiers associated with one or more CMRs from the CMR group.

12. The non-transitory computer readable program storage medium of claim 11, wherein an interference measurement for at least one CSI value is obtained based on at least one IMR.

13. The non-transitory computer readable program storage medium of claim 11, wherein an IMR includes a resource for interference measurement.

14. The non-transitory computer readable program storage medium of claim 11, wherein at least one CMRs and at least one IM Rs are associated with at least one CSI value.

15. The non-transitory computer readable program storage medium of claim 11, wherein the IMR group in the reporting configuration is associated with the CMR group associated with the reporting configuration.

* * * * *

UNITED STATES PATENT AND TRADEMARK OFFICE
CERTIFICATE OF CORRECTION

PATENT NO. : 11,777,576 B2  
APPLICATION NO. : 17/211295  
DATED : October 3, 2023  
INVENTOR(S) : Bo Gao et al.

Page 1 of 1

It is certified that error appears in the above-identified patent and that said Letters Patent is hereby corrected as shown below:

In the Claims

In Column 28, Line 45, in Claim 1, delete "a CMR in a CMR group," and insert --a CMR in the CMR group,--

In Column 28, Line 67, in Claim 4, delete "a CMR in a CMR group," and insert --a CMR in the CMR group,--

In Column 29, Lines 10-11, in Claim 7, delete "wherein at least one CMRs and at least one IMRs are associated with at least one CSI value." and insert --wherein at least one CMR of the CMR group and at least one IMR of the IMR group are associated with at least one CSI value.--

In Column 29, Lines 16-17, in Claim 9, delete "wherein at least one CMRs and at least one IMRs are associated with at least one CSI value." and insert --wherein at least one CMR of the CMR group and at least one IMR of the IMR group are associated with at least one CSI value.--

In Column 30, Line 9, in Claim 11, delete "a CMR in a CMR group," and insert --a CMR in the CMR group,--

In Column 30, Lines 21-22, in Claim 14, delete "wherein at least one CMRs and at least one IM Rs are associated with at least one CSI value." and insert --wherein at least one CMR of the CMR group and at least one IMR of the IMR group are associated with at least one CSI value.--

Signed and Sealed this  
Twenty-third Day of July, 2024

Katherine Kelly Vidal  
*Director of the United States Patent and Trademark Office*